(12) United States Patent
Sinha et al.

(10) Patent No.: US 11,954,467 B2
(45) Date of Patent: Apr. 9, 2024

(54) CONVOLUTIONAL NEURAL NETWORK COMPILER FOR PROGRAMMABLE FUNCTIONAL ARRAY (PFA) PROCESSORS

(71) Applicant: Pavel Sinha, Brossard (CA)

(72) Inventors: Pavel Sinha, Brossard (CA); Yunus Can Cukran, Seattle, WA (US); Beyza Yildirim, Montreal (CA)

(73) Assignee: Aarish Technologies, Brossard (CA)

( * ) Notice: Subject to any disclaimer, the term of this patent is extended or adjusted under 35 U.S.C. 154(b) by 77 days.

(21) Appl. No.: 17/881,511

(22) Filed: Aug. 4, 2022

(65) Prior Publication Data

US 2023/0070947 A1    Mar. 9, 2023

Related U.S. Application Data

(60) Provisional application No. 63/230,012, filed on Aug. 5, 2021.

(51) Int. Cl.
*G06F 8/41*    (2018.01)
*G06N 3/10*    (2006.01)

(52) U.S. Cl.
CPC ............... *G06F 8/447* (2013.01); *G06N 3/10* (2013.01)

(58) Field of Classification Search
CPC .................................. G06F 8/447; G06N 3/10
See application file for complete search history.

(56) References Cited

U.S. PATENT DOCUMENTS

| 2011/0206381 A1 | 8/2011 | Ji et al. |
| 2014/0180989 A1 | 6/2014 | Krizhevsky et al. |
| 2019/0012170 A1* | 1/2019 | Qadeer .................. G06F 17/16 |

FOREIGN PATENT DOCUMENTS

| CN | 113157183 A * | 7/2021 | ......... G06F 3/04845 |
| WO | WO-2019237811 A1 * | 12/2019 | ......... G06F 12/0207 |

OTHER PUBLICATIONS

Venkataramanaiah, et al., "Automatic Compiler Based FPGA Accelerator for CNN Training" (Year: 2019).*
Wu et al., "A Reconfigurable Convolutional Neural Network-Accelerated Coprocessor Based on RISC-V Instruction Set" (Year: 2020).*

(Continued)

*Primary Examiner* — Phillip H Nguyen
(74) *Attorney, Agent, or Firm* — LOZA & LOZA, LLP; Gabriel Fitch

(57) ABSTRACT

Convolutional neural network compilers for programmable functional array processors are provided. One such compiler involves a method for fitting a convolutional neural network (CNN) to a CNN processor to be performed by a compiler, the method comprising: receiving a CNN; converting the CNN into a CNN graph; converting the CNN graph into a memory graph comprising graph primitives corresponding to a plurality of components of the CNN processor including a primary memory; performing a memory analysis to determine an amount of memory required in the primary memory for at least one of the graph primitives; identifying a plurality of tokens within the memory graph to form a token graph, each of the plurality of tokens comprising one or more of the graph primitives; and generating, using the plurality of identified tokens, configuration settings for each of the plurality of components of the CNN processor.

24 Claims, 22 Drawing Sheets

(56) References Cited

OTHER PUBLICATIONS

Krizhevsky, Alex et al., "ImageNet Classification with Deep Convolutional Neural Networks", Advances in Neural Information Processing Systems; 2012; https://proceedings.neurips.cc/paper/2012/file/c399862d3b9d6b76c8436e924a68c45b-Paper.pdf; 9 pages.
Long, Jonathan et al., "Fully Convolutional Networks for Semantic Segmentation", Cornell University; Computer Science: Computer Vision and Pattern Recognition; Nov. 14, 2014; https://arxiv.org/abs/1411.4038; 10 pages.
Vinyals, Oriol et al., "Show and Tell: A Neural Image Caption Generator", Cornell University; Computer Science: Computer Vision and Pattern Recognition; Nov. 17, 2014; https://arxiv.org/abs/1411.4555; 9 pages.
Toshev, Alexander et al., "DeepPose: Human Pose Estimation via Deep Neural Networks", Cornell University; Computer Science: Computer Vision and Pattern Recognition; Dec. 17, 2013; https://arxiv.org/abs/1312.4659; 9 pages.
Lecun, Yann et al., "Gradient-Based Learning Applied to Document Recognition", Proceedings of the IEEE; vol. 86, Issue 11; Nov. 1998; https://ieeexplore.ieee.org/document/726791; 46 pages.
Zeiler, Matthew D. et al., "Visualizing and Understanding Convolutional Networks", Cornell University; Computer Science: Computer Vision and Pattern Recognition; Nov. 12, 2013; https://arxiv.org/abs/1311.2901; 11 pages.
Simonyan, Karen et al., "Very Deep Convolutional Networks for Large-Scale Image Recognition", Cornell University; Computer Science: Computer Vision and Pattern Recognition; Sep. 4, 2014; https://arxiv.org/abs/1409.1556; 14 pages.
Szegedy, Christian et al., "Going Deeper with Convolutions", Cornell University; Computer Science: Computer Vision and Pattern Recognition; Sep. 17, 2014; https://arxiv.org/abs/1409.4842; 12 pages.
He, Kaiming et al., "Deep Residual Learning for Image Recognition", Cornell University; Computer Science: Computer Vision and Pattern Recognition; Dec. 10, 2015; https://arxiv.org/abs/1512.03385; 12 pages.
Jaderberg, Max et al., "Spatial Transformer Networks", Cornell University; Computer Science: Computer Vision and Pattern Recognition; Jun. 5, 2015; https://arxiv.org/abs/1506.02025; 15 pages.
Szegedy, Christian et al., "Going Deeper with Convolutions", 2015 IEEE Conference on Computer Vision and Pattern Recognition; 2015; https://doi.ieeecomputersociety.org/10.1109/CVPR.2015.7298594; 9 pages.
He, Kaiming et al., "Spatial Pyramid Pooling in Deep Convolutional Networks for Visual Recognition", IEEE Transactions on Pattern Analysis and Machine Intelligence; vol. 37, Issue 9; Sep. 1, 2015; https://ieeexplore.ieee.org/document/7005506; 14 pages.
Jandola, Forrest N et al., "SqueezeNet: AlexNet-Level Accuracy with 50x Fewer Parameters and <0.5MB Model Size", Cornell University; Computer Science: Computer Vision and Pattern Recognition; Feb. 24, 2016; https://arxiv.org/abs/1602.07360; 13 pages.
Wan, Lihong et al., "Face Recognition with Convolutional Neural Networks and Subspace Learning", 2017 2nd International Conference on Image, Vision and Computing; Jun. 2-4, 2017; https://ieeexplore.ieee.org/document/7984551; 6 pages.
Canziani, Alfredo et al., "An Analysis of Deep Neural Network Models for Practical Applications", Cornell University; Computer Science: Computer Vision and Pattern Recognition; May 24, 2016; https://arxiv.org/abs/1605.07678; 7 pages.
Strigl, Daniel et al., "Performance and Scalability of GPU-based Convolutional Neural Networks", 2010 18th Euromicro Conference on Parallel, Distributed & Network-based Processing; Feb. 17-19, 2010; https://ieeexplore.ieee.org/document/5452452; 8 pages.
Ovtcharov, Kalin et al., "Accelerating Deep Convolutional Neural Networks Using Specialized Hardware", Microsoft Research; Feb. 22, 2015; https://www.microsoft.com/en-us/research/wp-content/uploads/2016/02/CNN20Whitepaper.pdf; 4 pages.
Andri, Renzo et al., "YodaNN: An Ultra-Low Power Convolutional Neural Network Accelerator Based on Binary Weights", 2016 IEEE Computer Society Annual Symposium on VLSI; Jul. 11-13, 2016; https://ieeexplore.ieee.org/document/7560203; 6 pages.
Jafri, Syed M. A. H. et al., "Can a Reconfigurable Architecture Beat ASIC as a CNN Accelerator?", 2017 International Conference on Embedded Computer Systems: Architectures, Modeling, and Simulation; Jul. 17-20, 2017; https://ieeexplore.ieee.org/abstract/document/8344616; 8 pages.
Jouppi, Norman P. et al., "In-Datacenter Performance Analysis of a Tensor Processing Unit", Cornell University; Computer Science: Hardware Architecture; Apr. 16, 2017; https://arxiv.org/abs/1704.04760; 17 pages.
Courbariaux, Matthieu et al., "BinaryConnect: Training Deep Neural Networks with Binary Weights During Propagations", Cornell University; Computer Science: Machine Learning; Nov. 2, 2015; https://arxiv.org/abs/1511.00363?context=cs; 9 pages.
Rastegari, Mohammad et al., "XNOR-Net: ImageNet Classification Using Binary Convolutional Neural Networks", Cornell University; Computer Science: Computer Vision and Pattern Recognition; Mar. 16, 2016; https://arxiv.org/abs/1603.05279; 17 pages.
Zhou, Shuchang et al., "DoReFa-Net: Training Low Bitwidth Convolutional Neural Networks with Low Bitwidth Gradients", Cornell University; Computer Science: Neural and Evolutionary Computing; Jun. 20, 2016; https://arxiv.org/abs/1606.06160; 13 pages.
Hubara, Itay et al., Quantized Neural Networks: Training Neural Networks with Low Precision Weights and Activations; Cornell University; Computer Science: Neural and Evolutionary Computing; Sep. 22, 2016; https://arxiv.org/abs/1609.07061; 29 pages.
Lin, Darryl D. et al., "Fixed Point Quantization of Deep Convolutional Networks", Cornell University; Computer Science: Machine Learning; Nov. 19, 2015; https://arxiv.org/abs/1511.06393?context=cs; 10 pages.
Mishra, Asit et al., "WRPN:Wide Reduced-Precision Networks", Cornell University; Computer Science: Computer Vision and Pattern Recognition; Sep. 4, 2017; https://arxiv.org/abs/1709.01134; 11 pages.
Chen, Yu-Hsin et al., "Eyeriss: An Energy-Efficient Reconfigurable Accelerator for Deep Convolutional Neural Networks", IEEE Journal of Solid-State Circuits; vol. 52, Issue 1; Jan. 2017; https://ieeexplore.ieee.org/document/7738524; 12 pages.
Moons, Bert et al., "A 0.3-2.6 TOPS/W Precision-Scalable Processor for Real-Time Large-Scale ConvNets", Cornell University; Computer Science: Hardware Architecture; Jun. 16, 2016; https://arxiv.org/pdf/1606.05094.pdf; 2 pages.
Moons, Bert et al., "14.5 Envision: A 0.26-to-10TOPS/W subword-parallel dynamic-voltage-accuracy-frequency-scalable Convolutional Neural Network processor in 28nm FDSOI", 2017 IEEE International Solid-State Circuits Conference; Feb. 2017; https://www.researchgate.net/publication/314297052_145_Envision_A_026-0-10TOPSW_subword-parallel_dynamic-voltage-accuracy-frequency-scalable_Convolutional_Neural_Network_processor_in_28nm_FDSOI; 5 pages.
Aimar, Alessandro et al., "NullHop: A Flexible Convolutional Neural Network Accelerator Based on Sparse Representations of Feature Maps", Cornell University; Computer Science: Computer Vision and Pattern Recognition; Jun. 5, 2017; https://arxiv.org/abs/1706.01406; 13 pages.
Groq, Inc., "Open Platform. Performance without Lock-In.", Jan. 4, 2019; Last accessed Dec. 14, 2022 via Wayback Machine; https://web.archive.org/web/20190104174009/https://groq.com/; 2 pages (Website).
Sun, Baohua et al., "Ultra Power-Efficient CNN Domain Specific Accelerator with 9.3TOPS/Watt for Mobile and Embedded Applications", Cornell University; Computer Science: Computer Vision and Pattern Recognition; Apr. 30, 2018; https://arxiv.org/abs/1805.00361; 9 pages.
Dennis, Jack B. et al., "An Efficient Pipelined Dataflow Processor Architecture", Supercomputing '88:Proceedings of the 1988 ACM/IEEE Conference on Supercomputing, vol. I; Nov. 14-18, 1988; https://ieeexplore.ieee.org/document/44674; 6 pages.

(56) References Cited

OTHER PUBLICATIONS

International Search Report and Written Opinion for International Application No. PCT/IB2020/000609, dated Nov. 4, 2020, 13 pages.
Pham, Phi-Hung et al., "NeuFlow: Dataflow Vision Processing System-on-a-Chip"; 2012 IEEE 55th International Midwest Symposium on Circuits and Systems; 2012; https://ieeexplore.IEEE.org/document/6292202; 4 pages.
Desoli, Giuseppe et al., "A 2.9TOPS/W Deep Convolutional Neural Network SoC in FD-SOI 28nm for Intelligent Embedded Systems"; 2017 IEEE International Solid-State Circuits Conference; 2017; https://ieeexplore.ieee.org/document/7870349; 3 pages.

\* cited by examiner

| C0 | C1 | C2 | C3 | C4 | C5 | C6 | C7 | C8 |
|---|---|---|---|---|---|---|---|---|
| 1 |  |  |  |  |  |  |  |  |
| 2 |  |  |  |  |  |  |  |  |
| 3 |  |  |  |  |  |  |  |  |
| 4 | C0(1-3), 1-3 |  |  | C0(1-3), 1-3 |  |  |  |  |
| 5 | C0(1-3), 1-3 |  |  | C0(1-3), 1-3 |  |  | C0(1-3), 1-3 |  |
| 6 | C0(1-3), 1-3 |  |  | C0(1-3), 1-3 |  |  | C0(1-3), 1-3 |  |
| 7 | C0(4-6), 4-6 | C1(1-3), 1 |  | C0(4-6), 4-6 | C4(1-3), 1 |  | C0(1-3), 1-3 |  |
| 8 | C0(4-6), 4-6 | C1(2-4), 2 |  | C0(4-6), 4-6 | C4(2-4), 2 |  |  |  |
| 9 | C0(4-6), 4-6 | C1(3-5), 3 |  | C0(4-6), 4-6 | C4(3-5), 3 |  |  |  |
| 10 | C0(7-9), 7-9 | C1(4-6), 4 | C2(1-3), 1 |  |  | C0(1-9), 1 |  |  |
| 11 | C0(7-9), 7-9 | C1(5-7), 5 | C2(2-4), 2 |  |  | C0(2-10), 2 |  |  |
| 12 | C0(7-9), 7-9 | C1(6-8), 6 | C2(3-5), 3 |  |  | C0(3-11), 3 |  |  |
| 13 | C0(10-12), 10-12 | C1(7-9), 7 | C2(4-6), 4 | C0(7-9), 7-9 | C4(4-6), 4 | C0(4-12), 4 | C0(4-6), 4-6 | C3,5,6,7(1-3), 1 |
| 14 | C0(10-12), 10-12 | C1(8-10), 8 | C2(5-7), 5 | C0(7-9), 7-9 | C4(5-7), 5 | C0(5-13), 5 | C0(4-6), 4-6 | C3,5,6,7(2-4), 2 |
| 15 | C0(10-12), 10-12 | C1(9-11), 9 | C2(6-8), 6 | C0(7-9), 7-9 | C4(6-8), 6 | C0(6-14), 6 | C0(4-6), 4-6 | C3,5,6,7(3-5), 3 |

*FIG. 11*

| C0 | C1 | C2 | C3 | C4 | C5 | C6 | C7 | C8 |
|---|---|---|---|---|---|---|---|---|
| 1 | | | | | | | | |
| 2 | | | | | | | | |
| 3 | | | | | | | | |
| 4 | C0(1-3), 1 | | | C0(1-3), 1 | | | C0(1-3), 1 | |
| 5 | C0(2-4), 2 | | | C0(2-4), 2 | | | C0(2-4), 2 | |
| 6 | C0(3-5), 3 | | | C0(3-5), 3 | | | C0(3-5), 3 | |
| 7 | C0(4-6), 4 | C1(1-3), 1-3 | | C0(4-6), 4 | C4(1-3), 1 | | C0(4-6), 4 | |
| 8 | C0(5-7), 5 | C1(1-3), 1-3 | | C0(5-7), 5 | C4(2-4), 2 | | | |
| 9 | C0(6-8), 6 | C1(1-3), 1-3 | | C0(6-8), 6 | C4(3-5), 3 | | | |
| 10 | C0(7-9), 7 | C1(4-6), 4-6 | C2(1-3), 1 | C0(7-9), 7 | C4(4-6), 4 | C0(1-9), 1 | | |
| 11 | C0(8-10), 8 | C1(4-6), 4-6 | C2(2-4), 2 | | | C0(2-10), 2 | | |
| 12 | C0(9-11), 9 | C1(4-6), 4-6 | C2(3-5), 3 | | | C0(3-11), 3 | | |
| 13 | C0(10-12), 10 | C1(7-9), 7-9 | C2(4-6), 4 | C0(8-10), 8 | C4(5-7), 5 | C0(4-12), 4 | C0(5-7), 5 | C3,5,6,7(1-3), 1 |
| 14 | C0(11-13), 11 | C1(7-9), 7-9 | C2(5-7), 5 | C0(9-11), 9 | C4(6-8), 6 | C0(5-13), 5 | C0(6-8), 6 | C3,5,6,7(2-4), 2 |
| 15 | C0(12-14), 12 | C1(7-9), 7-9 | C2(6-8), 6 | C0(10-12), 10 | C4(7-9), 7 | C0(6-14), 6 | C0(7-9), 7 | C3,5,6,7(3-5), 3 |

FIG. 13

CONVOLUTIONAL NEURAL NETWORK COMPILER FOR PROGRAMMABLE FUNCTIONAL ARRAY (PFA) PROCESSORS

CROSS-REFERENCE TO RELATED APPLICATION(S)

This application claims priority to and the benefit of U.S. Provisional Application No. 63/230,012 filed on Aug. 5, 2021, "CONVOLUTIONAL NEURAL NETWORK COMPILER FOR PROGRAMMABLE FUNCTIONAL ARRAY (PFA) PROCESSORS," the entire content of which is incorporated herein by reference.

FIELD

The subject matter described herein generally relates to compilers for neural networks, and more particularly, to convolutional neural network compilers for programmable functional array processors.

INTRODUCTION

Deep learning, which may also be referred to as deep structured learning or hierarchical learning is part of a broader family of machine learning methods based on artificial neural networks. Learning can be supervised, semi-supervised or unsupervised. Deep learning architectures such as deep neural networks, deep belief networks, recurrent neural networks and convolutional neural networks (CNNs) have been applied to a number of fields, including image classification and natural language processing, where they have produced results comparable to human experts. For example, deep learning has resulted in state-of-the-art performance in image recognition and vision tasks such as object recognition, semantic segmentation, image captioning, human pose estimation and more. Most of these achievements can be attributed to the use of CNNs capable of learning complex hierarchical feature representation.

With the increase in complexity of CNNs, hardware requirements pose challenges to the state-of-the-art implementation. Practical limits on resources such as memory, computation, and consumed power have hindered the exploration of very deep and efficient neural networks. Common approaches to accelerate computation of CNNs used today may involve using graphical processing units (GPUs) and even custom hardware solutions. These custom hardware solutions can be effective in efficient implementing various CNNs. However, software for converting CNNs to custom hardware solutions is either not well suited for the particular hardware or does not exist.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, the disclosure provides a method for fitting a convolutional neural network (CNN) to a CNN processor to be performed by a compiler, the method comprising: receiving a CNN; converting the CNN into a CNN graph; converting the CNN graph into a memory graph comprising graph primitives corresponding to a plurality of components of the CNN processor including a primary memory; performing a memory analysis to determine an amount of memory required in the primary memory for at least one of the graph primitives; identifying a plurality of tokens within the memory graph to form a token graph, each of the plurality of tokens comprising one or more of the graph primitives; and generating, using the plurality of identified tokens, configuration settings for each of the plurality of components of the CNN processor.

In one aspect of the method, the graph primitives comprise a write buffer, a read buffer, and a core compute element.

In one aspect of the method, the core compute element is pre-configured to perform at least one function of the CNN, the at least one function comprising at least one of convolution, batch normalization, pooling, or activation.

In one aspect of the method, the write buffer and the read buffer are sub-components of the primary memory.

In one aspect of the method, the performing the memory analysis to determine the amount of memory required in the primary memory for at least one of the graph primitives comprises: determining a minimum number of lines of an image to be stored in the primary memory, the image to be processed by the core compute element; and wherein the configuration settings for the core compute element comprise the minimum number of lines to be stored in the primary memory.

In one aspect of the method, the performing the memory analysis to determine the amount of memory required in the primary memory for at least one of the graph primitives further comprises: refraining from storing the lines of the image other than the minimum number in the primary memory.

In one aspect of the method, the performing the memory analysis to determine the amount of memory required in the primary memory for at least one of the graph primitives further comprises: determining an expected delay in exchanges of data between at least two of the graph primitives; determining, based on the expected delay, a minimum number of lines of an image to be stored in the primary memory, the image to be processed by a core compute element; and wherein the configuration settings for the core compute element comprise the minimum number of lines to be stored in the primary memory.

In one aspect of the method, the CNN comprises a plurality of programmable functional units; and wherein the identifying the plurality of tokens within the memory graph to form the token graph comprises: identifying groups of the graph primitives to be mapped to one of the plurality of programmable functional units, wherein each token of the plurality of tokens represents a group of the graph primitives to be mapped to one of the plurality of programmable functional units.

In one aspect of the method, further comprising performing, using a greedy or a heuristic technique, a simulated placement of each token within one of the plurality of programmable functional units to determine an optimized placement.

In one aspect of the method, further comprising repeating the simulated placement to determine the optimized placement.

In one aspect of the method, further comprising: determining, based on the simulated placement, that the CNN in the token graph format will fit within the CNN processor;

and wherein the generating, using the plurality of identified tokens, configuration settings for each of the plurality of components of the CNN processor comprises generating, based on the determination that the CNN will fit and using the plurality of identified tokens, configuration settings for each of the plurality of components of the CNN processor.

In one aspect of the method, wherein the graph primitives comprise a plurality of core compute elements; and wherein the generating, using the plurality of identified tokens, configuration settings for each of the plurality of components of the CNN processor comprises generating, using the plurality of identified tokens, configuration settings for the core compute elements such that each of the core compute elements does not store inputs and does not store intermediate tensor values.

In one aspect, the disclosure provides a non-transitory computer-readable medium storing computer-executable instructions for fitting a convolutional neural network (CNN) to a CNN processor to be performed by a compiler, the medium comprising instructions for: receiving a CNN; converting the CNN into a CNN graph; converting the CNN graph into a memory graph comprising graph primitives corresponding to a plurality of components of the CNN processor including a primary memory; performing a memory analysis to determine an amount of memory required in the primary memory for at least one of the graph primitives; identifying a plurality of tokens within the memory graph to form a token graph, each of the plurality of tokens comprising one or more of the graph primitives; and generating, using the plurality of identified tokens, configuration settings for each of the plurality of components of the CNN processor.

In one aspect of the computer-readable medium, wherein the graph primitives comprise a write buffer, a read buffer, and a core compute element.

In one aspect of the computer-readable medium, wherein the core compute element is pre-configured to perform at least one function of the CNN, the at least one function comprising at least one of convolution, batch normalization, pooling, or activation.

In one aspect of the computer-readable medium, wherein the write buffer and the read buffer are sub-components of the primary memory.

In one aspect of the computer-readable medium, wherein the instructions for performing the memory analysis to determine the amount of memory required in the primary memory for at least one of the graph primitives comprises: instructions for determining a minimum number of lines of an image to be stored in the primary memory, the image to be processed by the core compute element; and wherein the configuration settings for the core compute element comprise the minimum number of lines to be stored in the primary memory.

In one aspect of the computer-readable medium, wherein the instructions for performing the memory analysis to determine the amount of memory required in the primary memory for at least one of the graph primitives further comprises: instructions for refraining from storing the lines of the image other than the minimum number in the primary memory.

In one aspect of the computer-readable medium, wherein instructions for performing the memory analysis to determine the amount of memory required in the primary memory for at least one of the graph primitives further comprises: instructions for determining an expected delay in exchanges of data between at least two of the graph primitives; instructions for determining, based on the expected delay, a minimum number of lines of an image to be stored in the primary memory, the image to be processed by a core compute element; and wherein the configuration settings for the core compute element comprise the minimum number of lines to be stored in the primary memory.

In one aspect of the computer-readable medium, wherein the CNN comprises a plurality of programmable functional units; and wherein the instructions for identifying the plurality of tokens within the memory graph to form the token graph comprises: instructions for identifying groups of the graph primitives to be mapped to one of the plurality of programmable functional units, wherein each token of the plurality of tokens represents a group of the graph primitives to be mapped to one of the plurality of programmable functional units.

In one aspect of the computer-readable medium, further comprising instructions for performing, using a greedy or a heuristic technique, a simulated placement of each token within one of the plurality of programmable functional units to determine an optimized placement.

In one aspect of the computer-readable medium, further comprising instructions for repeating the simulated placement to determine the optimized placement.

In one aspect of the computer-readable medium, further comprising instructions for: determining, based on the simulated placement, that the CNN in the token graph format will fit within the CNN processor; and wherein the instructions for generating, using the plurality of identified tokens, configuration settings for each of the plurality of components of the CNN processor comprise instructions for generating, based on the determination that the CNN will fit and using the plurality of identified tokens, configuration settings for each of the plurality of components of the CNN processor.

In one aspect of the computer-readable medium, wherein the graph primitives comprise a plurality of core compute elements; and wherein the instructions for generating, using the plurality of identified tokens, configuration settings for each of the plurality of components of the CNN processor comprise instructions for generating, using the plurality of identified tokens, configuration settings for the core compute elements such that each of the core compute elements does not store inputs and does not store intermediate tensor values.

BRIEF DESCRIPTION OF THE DRAWINGS

FIG. 11 is a table illustrating timing for the first memory graph split of FIG. 10 in accordance with some aspects of the disclosure.

FIG. 13 is a table illustrating timing for the second memory graph split of FIG. 12 in accordance with some aspects of the disclosure.

DETAILED DESCRIPTION

Figure 1:
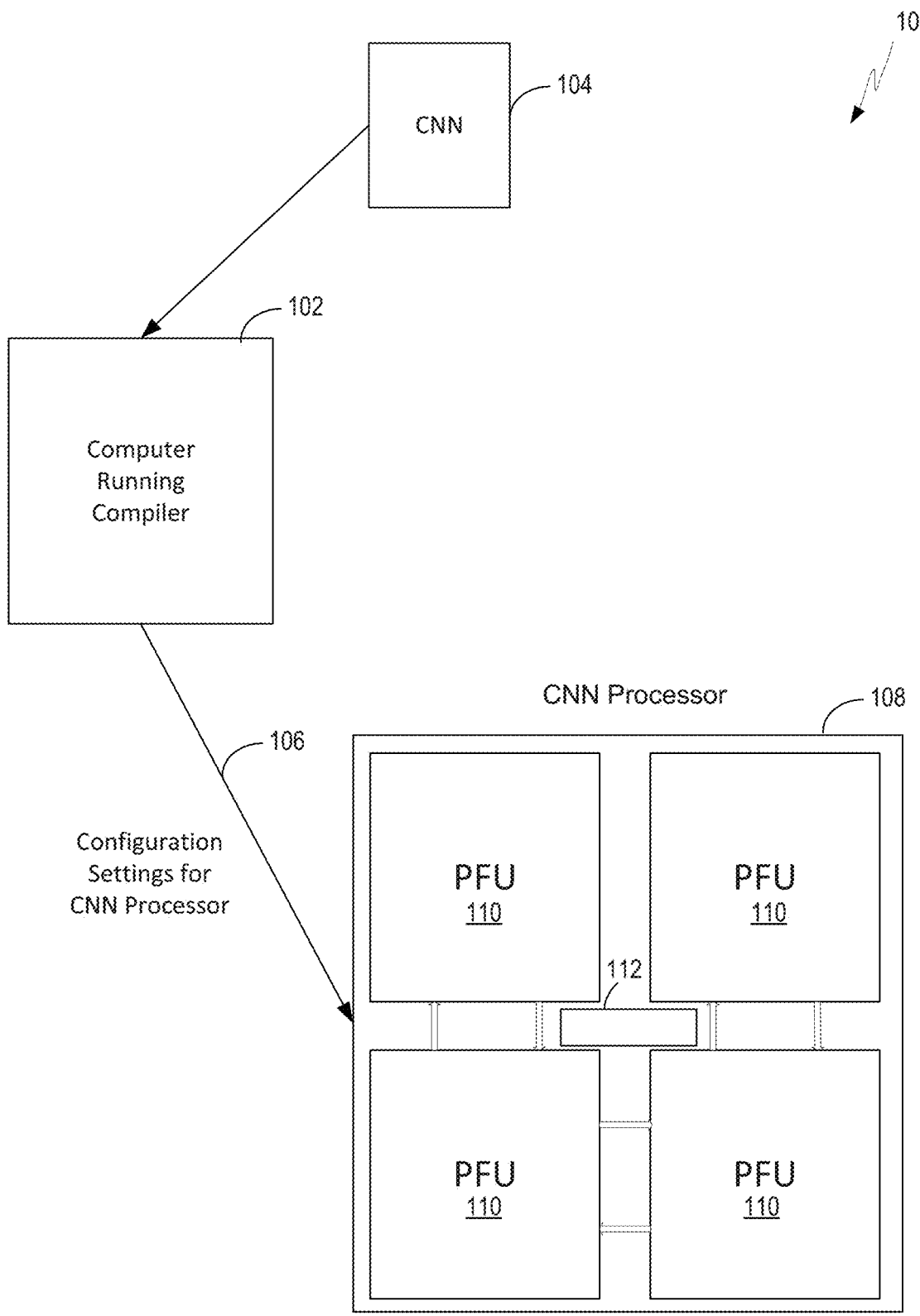
FIG. 1 shows a block diagram of a system with a compiler that receives a convolutional neural network (CNN) and generates configuration settings based on the CNN for a custom CNN processor in accordance with some aspects of the disclosure.

Referring now to the drawings, systems and methods for providing convolutional neural network (CNN) compilers for programmable functional array processors (e.g., CNN processors) are illustrated. One such method includes receiving a CNN, converting the CNN into a CNN graph, converting the CNN graph into a memory graph including graph primitives corresponding to components of the CNN processor including a primary memory, performing a memory analysis to determine an amount of memory required in the primary memory for at least one of the graph primitives, identifying tokens within the memory graph to form a token graph, each of the tokens including one or more of the graph primitives, and generating, using the identified tokens, configuration settings for each of the components of the CNN processor. The configuration settings can be stored in a non-volatile memory of the CNN processor and loaded upon initialization of the CNN processor. In one aspect, the CNN processor is a custom or specialized programmable functional array configured specifically for processing/implementing a CNN.

Overview of CNN Processor Architecture

One drawback of conventional architectures for processing CNNs is these architectures merely offer the traditional load/store architecture paradigm and thus are not geared specifically for CNN architectures. Traditional load/store architectures have a separate mechanism to pre-program the intended task while the data to be operated on is handled separately by a typical data-path architecture. In the configurable CNN processor architectures described herein we infuse a major part of the program control sequence into the data-flow itself, making it a highly efficient processor and at the same time highly specialized for processing CNNs.

One design goal involves developing a processor architecture intended for computing various CNN architectures. Ideally, the architecture needs to be low-cost, low-power and be able to process CNN architectures in real-time without accessing external memory. In one aspect, the configurable CNN processors described herein could be used as a co-processor to a system in order to compute CNN architectures. This enables use of architectural techniques that constrain the use of power by the processor. This disclosure involves one or more extremely low-power solutions by eliminating the need for a traditional controller for the data-flow control. In one aspect, this disclosure couples the control of data-flow across various modules of the processor with the data-in-flow to the architecture. Therefore, the data flowing in can be responsible for pushing the data through the system to the output. This kind of an architecture represents a data-flow architecture. In one aspect, the disclosure also involves use of hierarchically-distributed micro-programmed control-memory for a part of the control flow that cannot be coupled with the data-flow across the system.

A CNN architecture may require a large quantity of temporary memory to store output data at every layer of the CNN. This disclosure arranges data in such a way that the memory needs of different layers of the CNN may be aggregated and addressed using memory located in one physical space. This has significant benefits to power consumed and area efficiency. Simultaneously the disclosed architecture takes advantage of the fact that one may only need to store a certain number of input rows to successfully compute the convolution at each CNN layer, where storing the entire frame may be unnecessary for the convolutional stages of the CNN. Hence, the disclosed compiler targets a processor architecture, that in some aspects, may store only the necessary line buffers at the input of each CNN. This has a combined effect, including reductions of net power consumed and chip area used for the overall architecture.

In one aspect, the configurable CNN processor includes an intelligent memory (IMEM) buffer (e.g., active memory buffer) that may have multiple input ports and multiple output ports. The intelligent memory buffer accepts input data from the multiple input data ports and stores them in a core memory array contained within the buffer. The intelligent memory buffer, using the multiple output ports, can distribute desired data to the correct core compute element (e.g., computational core module) while maintaining a standard protocol for delivering the data, in an order that is standardized throughout the system. This distribution of data can eliminate the need for using a program sequence to control the flow of data movement. Each of the core compute elements/modules can thus maintain a very simple profile of processing a repetitive task on the data with certain periodicity. The minimal programming information that may not be easily embedded in the data-flow control can be stored as a control sequence in the form of a hierarchically distributed micro-programmed control unit contained with each core compute element.

After processing data corresponding to a particular CNN layer, data can be written back to the intelligent memory buffer. Once data is available from the output of a CNN layer, the next layer can start to get processed, and so on. Therefore, the flow of data can be controlled by the rate at which data flows into the system. This eliminates the need for a load-store architecture to manage the flow of data across the system. Also, data is moved within the configurable CNN processor architecture in a very intelligent way that minimizes redundant data movement.

There are several modes of data transfer from the intelligent memory buffer to reduce redundant data transfer from memory to computational units. Data flow in-and-out of the intelligent buffer can be managed using an elastic FIFO thereby allowing flexible movement of data across the system, and making all internal data transfers less rigid. In one aspect, it may be expected that the intelligent memory buffer would endure heavy fan out driving numerous computational modules that operate in parallel. This typically might result in a relatively high-power penalty arising from use of multiple buffers to meet the timing requirements. In one aspect, this may further increase exponentially in chip layouts where transistors are made to be smaller and smaller. To decouple timing constraints from data flowing through and in-and-out of the core compute elements, all inputs and outputs of the computational module can be buffered using FIFOs. This allows different components in the system to operate asynchronous to each other. Further, this gives the ability to operate different core compute elements at different clock speeds to optimize power consumption.

The individual core compute elements can be highly flexible modules and can perform computations on small blocks of data. Each of the core compute elements, apart from communicating with the intelligent memory buffer, can communicate with nearby core compute elements. The core compute elements may be arranged in a hierarchical manner.

A group of hierarchically arranged core compute elements may be grouped along with an intelligent memory buffer to make up a unit that is easily scalable. This makes the system highly modular and easy to scale. The modular system allows for multiple CNN architectures (e.g., multiple CNNs) to be executed in parallel, and also for multiple instances of such scalable modules to be cascaded together, and thereby implement very large CNN architectures.

In one aspect, the compilers described herein target at least some CNN architectures that can guarantee a low power profile by optimizing the total read and write operations from memory. The configurable CNN processor architecture can also provide a mechanism to move data across memory and computation blocks in a very efficient and optimal manner. In one aspect, it may reduce any redundant data movement across modules. In one aspect, the optimal power consumption can come from guaranteeing toggling of only the required bits and reducing redundancy and unnecessary toggling of bits across the system. The overall system architecture of embedding data-flow control in the data further can enhance optimal power consumption of the module. The design can also allow every core compute element and active memory buffer, or at least a subset of those components, to work on separate clock domains, thereby taking advantage of reducing clock distribution power of high frequency clocks.

In one aspect, the core compute elements could be dynamically set to use a higher frequency clock and the operating clock frequency of the intelligent memory buffer could be set to use a lower frequency clock for optimal power consumption. The core compute elements can operated under different modes of operation allowing each to be dynamically configured as any of the following operations: (1) a generic filter, (2) a separable filter, (3) a filter across multiple frames when time is another filter dimension (e.g., a 3D convolutional operation) or (4) long short term memory (LSTM) cells, where each of the core compute elements is dynamically configured into multiple parallel the LSTM cells.

Additional aspects of CNN processors are described below, and in U.S. patent application Ser. No. 16/933,859, entitled "CONFIGURABLE PROCESSOR FOR IMPLEMENTING CONVOLUTION NEURAL NETWORKS," filed on Jul. 20, 2020, the entire content of which is incorporated herein by reference.

This disclosure presents a compiler for inputting any CNN and generating the configuration settings for the above-described custom CNN processor to implement the input CNN.

Compiler for CNN Processor

FIG. 1 shows a block diagram of a system 100 with a compiler 102 that receives a convolutional neural network (CNN) 104 and generates configuration settings 106 based on the CNN for a custom CNN processor 108 in accordance with some aspects of the disclosure. The computing device 102 executing the compiler could be implemented as a laptop computer, a desktop computer, a tablet computer, or any other computing device capable of executing the compiler to generate the configuration settings.

The CNN processor 108 includes four programmable functional units (PFUs) 110 interconnected with an interconnection module 112. Interconnectivity between the PFU's can be controlled by the interconnect module 112, which may be programmed at compile time as described by the CNN data flow graph. The PFUs will be described in further detail below. In one aspect, the CNN processor 108 can be implemented as a single chip. In one aspect, the CNN processor 108 can be implemented with more than or less than four PFUs.

The CNN processor 108 can also be referred to as a programmable functional array (PFA) which consists of an array of PFUs as seen in FIG. 1.

Figure 2:
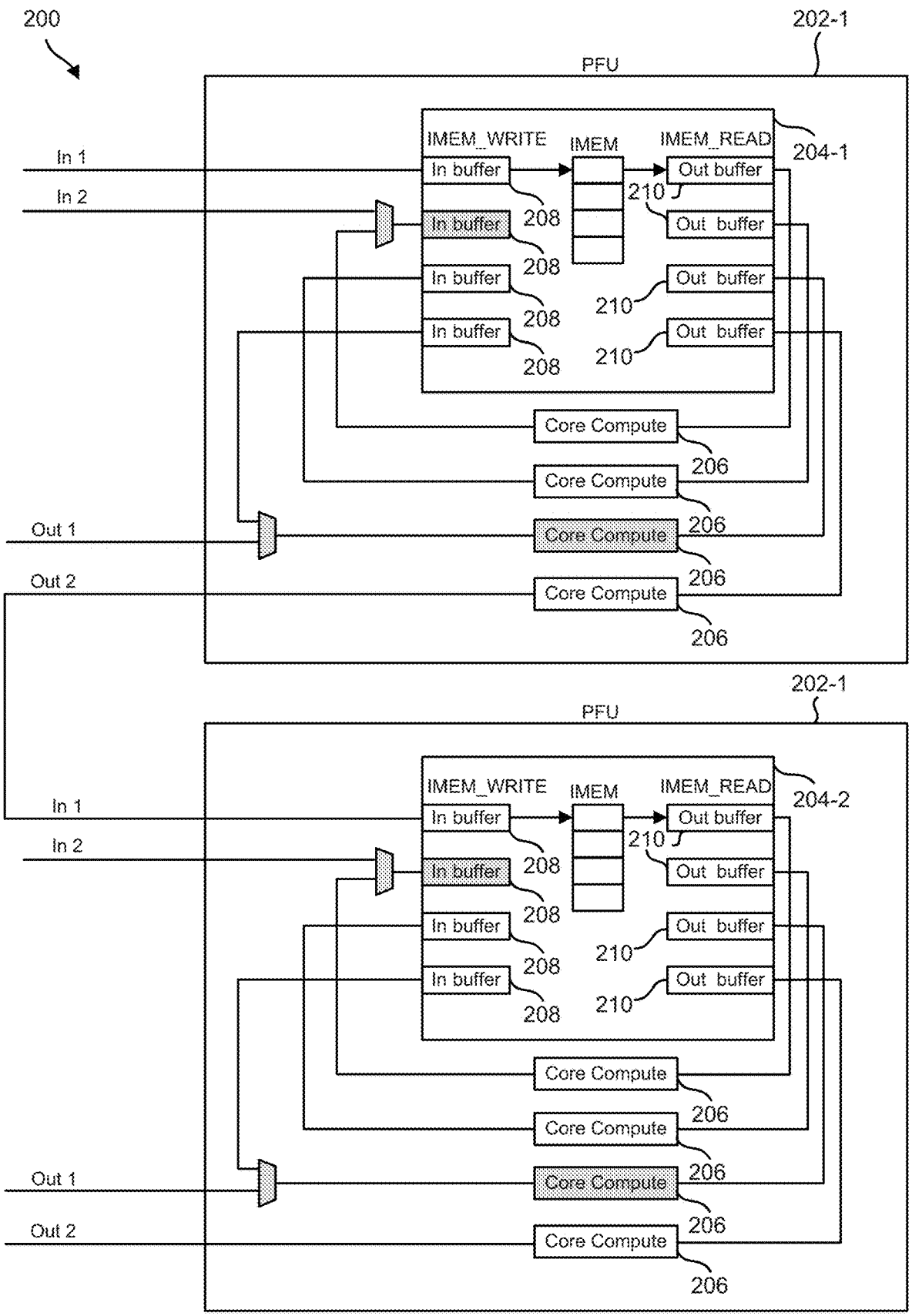
FIG. 2 shows a block diagram of a CNN processor with two programmable functional units (PFUs) each including an intelligent memory buffer (IMEM buffer) in accordance with some aspects of the disclosure.

FIG. 2 shows a block diagram of a CNN processor 200 with two programmable functional units (PFUs) (202-1, 202-2) each including an intelligent memory buffer (IMEM buffer) (204-1, 204-2) in accordance with some aspects of the disclosure. In one aspect, CNN processor 200 can be viewed as the CNN processor 108 of FIG. 1 where only two of the four PFUs are shown. As shown in FIG. 2, each of the PFUs (202-1, 202-2) includes an intelligent memory (IMEM) buffer (204-1, 204-2) and four core compute elements 206. Each IMEM buffer (204-1, 204-2) includes four input buffers 208, four output buffers 210, and an internal memory 212.

The main element of a PFU is the intelligent memory (IMEM), which is responsible for coordinating the storage and movement of data throughout the PFU. In doing so, IMEM also controls the synchronization between computation operations. Each PFU (202-1, 202-2) has input buffers (IMEM_WRITE) which write to IMEM, and output buffers (IMEM_READ) that read data from the IMEM. IMEM can generally only interact with the core compute elements through these buffers. In one aspect, the read/write memory address locations are assigned to the buffers at compile time, and they do not change their assigned address during runtime.

The main computation element of a PFU (202-1, 202-2) is a core compute (CC) unit/element 206. The CCs 206 ingest their input data through an IMEM_READ buffer 210 reading from IMEM 212. Their outputs are written back to IMEM via IMEM_WRITE buffers 208. In one aspect, all inputs and outputs to a core compute element 206 are synchronized by IMEM buffers. Each core compute element 206 is assigned by this compiler to perform a set of operations. These abstract operations can include CONV, BATCH-NORM, POOL, and ACTIVATION. While a CC can be set to empty operations, it is generally programmed for a CONV operation followed by a subset of {BATCH-NORM, POOL, ACTIVATION} operations. In Backus-Naur form (BNF) notation, the assignment can be formalized as {CONV}, [BATCH-NORM], [POOL], [ACTIVATION]. Note that these are abstract operators and in practice they will be specified as a 3×3 Strided Convolution or a GlobalAveragePool. In one aspect, parameters required for these operators, such as convolution weights, or batch normalization beta and gammas, are stored within each core compute element's own memory, and not in IMEM. In one aspect, each CC has a local memory sufficient to store a weight needed for processing convolutions or other operations as noted above. During a memory liveness analysis procedure that will be discussed below, the compiler can calculate a size needed for a given CC weight and confirm that the size is less than a size of the local memory. In one aspect, during operation of the CNN processor and PFU, each CC does not store any inputs or intermediate calculated values (e.g., intermediate tensor values). The inputs are obtained from IMEM read buffers and intermediate values are simply not stored anywhere. In one aspect, each of the core compute elements is not responsible for data flow. In one aspect, they may have tiny input and output buffers, but don't participate in directing the flow of input/output tensor data. This data flow control of the tensors is controlled by the IMEM.

A PFU has at minimum one external (IMEM_WRITE) buffer where the input tensor to it comes via an external input to the PFU (denoted as In 1). Up to n IMEM_WRITE buffers can be configurable buffers (denoted as buffer coupled to In 2). Configurable buffers can be configured to be either external or internal (e.g., write outputs of an internal CC, or take external tensors to write to IMEM). As a result, a PFU can take at most n+1 external tensors as its input. In FIG. 2, the PFUs (202-1, 202-2) have one configurable buffer 208 (coupled to In 2), and therefore these PFUs can have at most two external inputs (In 1 and In 2).

IMEM_READ buffers 210 read contiguous blocks of memory from IMEM 212 and channel this data to the CCs 206. Each PFU has at minimum one external CC (e.g., CC 206 coupled to Out 2), where its output tensor is directly transferred to the outside of the PFU. Up to n CCs can be configurable CCs, where they can either transfer their tensors outside, or to the internal IMEM 212 through an IMEM_WRITE buffer 208 like regular CCs. In the example shown in FIG. 2, each of the PFUs have one configurable CC 206 shown as coupled to Out 1.

In one aspect, the decision of how a configurable buffer or configurable CC acts is decided at the compile time and does not change through the runtime. Each IMEM_WRITE buffer 208 writes to a specific contiguous segment. Similarly, each IMEM_READ buffer 210 reads a specific contiguous segment. Multiple IMEM_READ buffers 210 can read from the same memory locations.

The compiler, as disclosed herein, is a program that takes a trained neural network graph and performs a series of transformations on the network graph to convert it into an output graph. The output graph of the compiler can be mapped to a hypothetical PFU that has infinite IMEM, CCs, IMEM_READs, and IMEM_WRITEs.

The compiler, as disclosed herein, differs from regular programming language compilers in various aspects. Many of these language compilers take text files as an input and use lexers to identify tokens. Then, they use parsers to generate an abstract syntax tree (AST). The conversion of a trained neural network into the defined input format of the disclosed compiler may be analogous to a compiler creating an AST. This step is beyond the scope of the disclosed compiler. With the input that is in the form of a grammatically well-defined neural network graph, it can be assumed the input was already lexically analyzed and parsed.

Language compilers use AST to generate an intermediate code and map the intermediate code to a target machine language through optimization. The PFA does not have a target machine language. The input neural network graph (i.e., the AST analogue) is transformed into another graph, and not into an ISA target language. In this aspect, aspects of the compiler can be thought of as closer to circuit synthesizers.

In one aspect, the compiler can be defined as a program which has two stages. In the first stage, the compiler process can involve taking a trained neural network in the format of a grammatically well-defined neural network graph (e.g., CNN graph) and converting it into a graph for a hypothetical PFU in the format of an IMEM graph. In a second stage, the compiler process can involve performing a tensor liveness analysis (e.g., memory liveness analysis including a dataflow analysis to statically determine memory storage requirements).

Input standardization is a primary challenge, as there are many deep learning libraries and various neural networks that need to be mapped into PFUs in different ways. This variety in the ecosystem means neural networks may be encoded in different file formats. In order to serve a wide variety of use cases while ensuring a well-defined input, a neural network graph representation in the form of a directed acyclic graph (DAG) where each node is a well-defined operator from a set is needed.

To leverage this standardization, the compiler's input can be limited to a neural network graph, a DAG where each node is from a defined set of operators by a specification. The neural network graph is a representation of a trained neural network, and can contain the model architecture and all learned parameters. It can be used for inference via the neural network graph runtime. It is generated post-training, either by machine learning (ML) platforms (PyTorch, TensorFlow, Keras) or via third party libraries. The neural network graph can be implemented using the ONNX specification (https://github.com/onnx/onnx/blob/master/docs/Operators.md), and its format is formally specified in their open-source repository (https://github.com/onnx/onnx/blob/master/docs/IR.md). In one implementation, the ONNX platform (https://onnx.ai/) was selected for the representation of the neural network graph.

Figure 3:
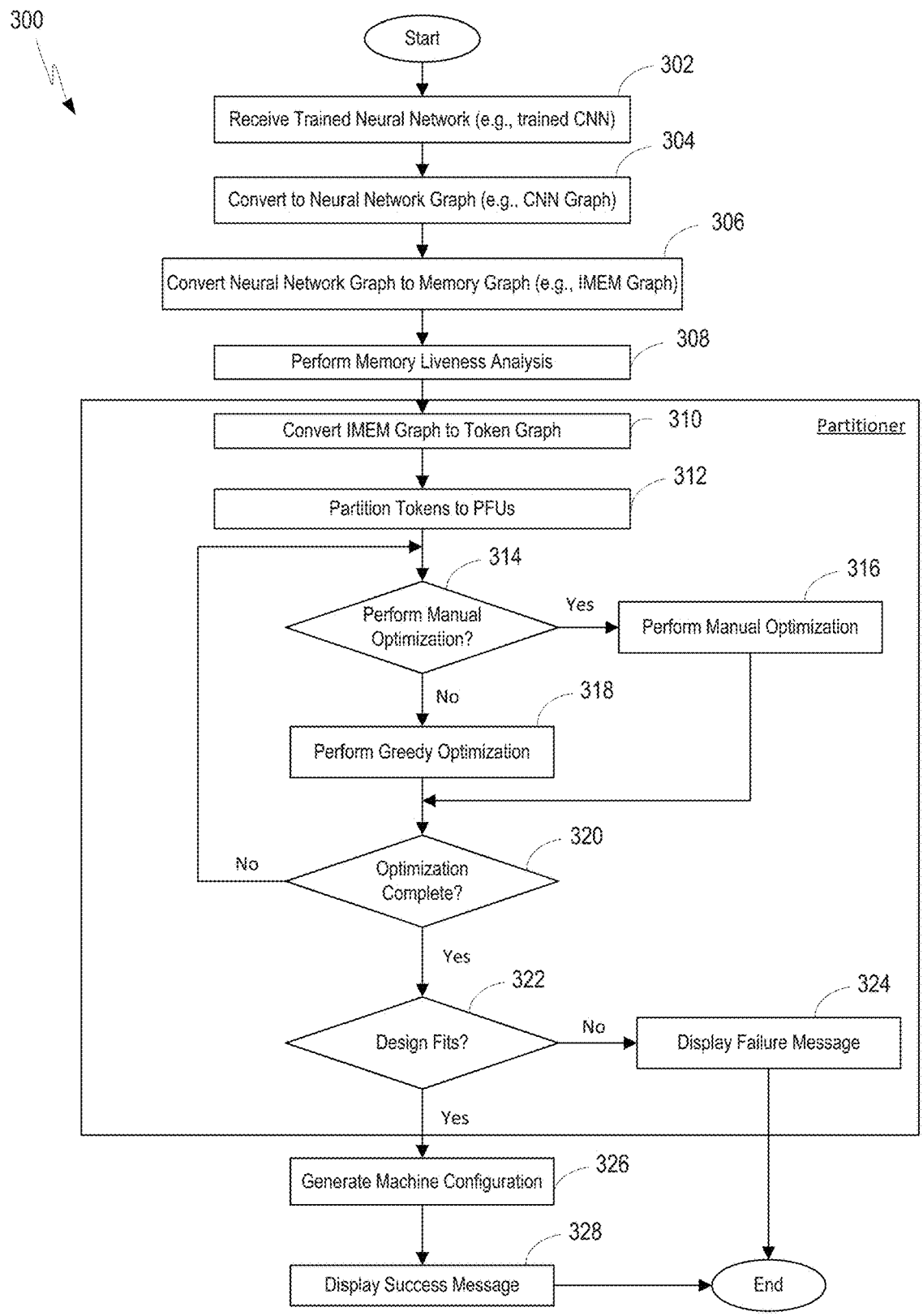
FIG. 3 is a flowchart illustrating a process for a compiler that receives an input CNN and outputs configuration settings for a custom CNN processor based on the input CNN in accordance with some aspects of the disclosure.

FIG. 3 is a flowchart illustrating a process 300 for a compiler that receives an input CNN and outputs configuration settings for a custom CNN processor based on the input CNN in accordance with some aspects of the disclosure. In one aspect, the process 300 can be executed on the computing device 102 of FIG. 1 or the computing device 1800 of FIG. 18. In one aspect, the configuration settings can be used to program any of the CNN processors described herein, including, for example, CNN processor 108 of FIG. 1 and CNN processor 200 of FIG. 2.

At block 302, the process receives a trained neural network (e.g., a trained CNN). In one aspect, the trained CNN is received as a text file that includes all of the details and parameters of the trained CNN.

At block 304, the process converts the received CNN into a neural network graph (e.g., CNN graph). In one aspect, the CNN graph is a directed acyclic graph (DAG). In one aspect, the input CNN is received as a DAG and the process does not need to convert a text-based version of the CNN into a CNN graph.

Figures 5A, 5B:
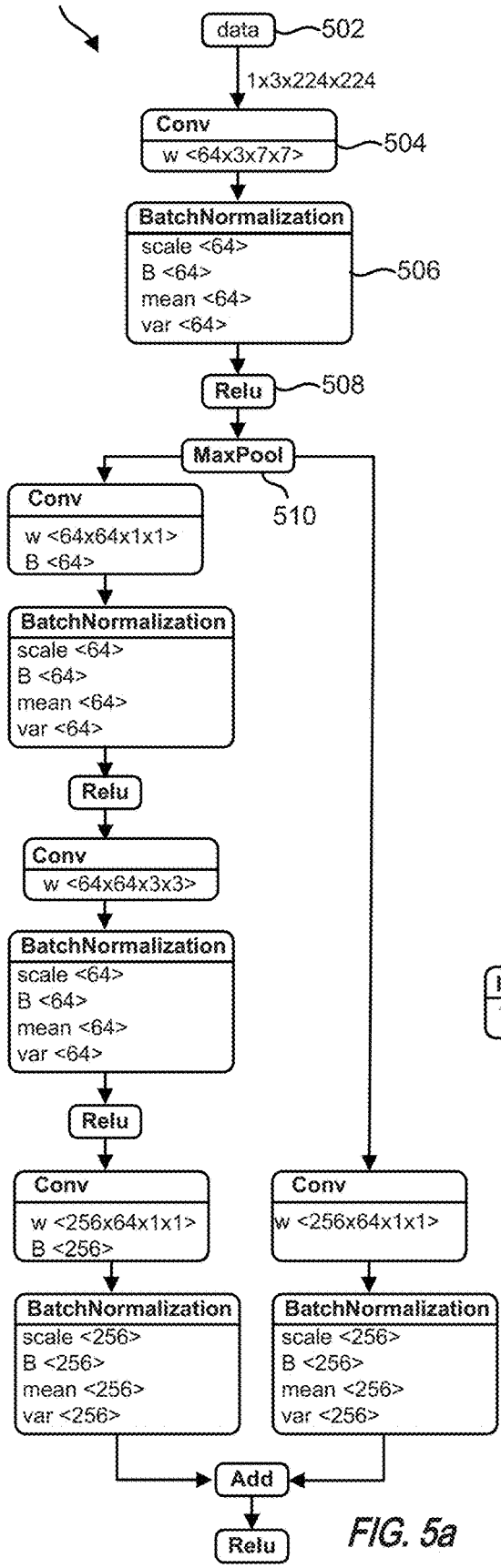
FIG. 5*a* is a schematic diagram of a directed acyclic graph of an exemplary CNN graph (CNN graph) in accordance with some aspects of the disclosure.
FIG. 5*b* is a schematic diagram of the CNN graph of FIG. 5*a* after conversion into a memory graph (IMEM graph) in accordance with some aspects of the disclosure.

At block 306, the process converts the CNN graph into a memory graph (e.g., intelligent memory (IMEM) graph). The memory graph can include a finite set of graph primitives (IMEM_Write, IMEM_Read, CoreCompute) corresponding to a plurality of components of the CNN processor, which also includes a primary memory (IMEM). FIGS. 5a and 5b show examples of a CNN graph and a resulting IMEM graph after the conversion. CNN graph primitives such as Cony, BatchNormalization, Relu, and MaxPool with first settings have been converted to IMEM graph primitives such as IMEM_Write, IMEM_Read, and CoreCompute with appropriate second settings. Further details of the conversion process are described below in the sections discussing FIGS. 5a and 5b.

At block 308, the process performs a memory liveness analysis. In one aspect, this analysis determines the amount of memory needed in the primary memory (IMEM) for each of the graph primitives. This analysis involves analyzing the CNN graph primitives and their settings to determine the appropriate corresponding IMEM graph primitive and the minimum memory needed for that IMEM graph primitive to function properly. In one aspect, for example, the process can determine a minimum number of lines of an image to be stored in the primary memory by the graph primitive, where the image is to be processed by the core compute element. Similarly, the process can also determine not to store (e.g., refrain from storing) the lines of the image other than the minimum number in the primary memory. This has a number of benefits including minimizing the memory required and thereby enabling a CNN to be fit to the CNN processor. Further details of this comprehensive analysis are described below in the discussions of FIGS. 6a, 6b, 7a, 7b, 8-13, 14a, 14b, 14c, and 15.

At block 310, the process converts the IMEM graph to a token graph. In one aspect, this is done by partitioning the IMEM graph into segments that consist of groups of graph primitives, where each segment will be treated as a token. In one aspect, the token is an indivisible unit of the graph primitives as viewed by the compiler. In addition, for this aspect, the token must be placed in one PFU, and thus its contents cannot be spread among multiple PFUs. Among other things, this helps to ensure memory efficiency and timing requirements between components of the CNN processor can be met in order to implement the input CNN. Further details of this conversion to the token graph are described below in the discussion of FIG. 16.

At block 312, the process partitions (e.g., fits) tokens to PFUs. In one aspect, this step can be viewed as a logical place and route routine (e.g., like FPGA place and route) where the compiler determines which physical components of the CNN processor, on a single PFU, will be assigned to implement which of the graph primitives that form a token. Further details of this fitting process are described below in the discussion of the "Partitioner" and of FIGS. 14a, 14b, 14c, and 15.

At block 314, the process determines whether to perform manual optimization (e.g., whether to optimize on the first or subsequent rounds of the fitting process).

If so, at block 316, the process performs manual optimization. In one aspect, this may involve a user making manual changes to the fit of tokens into the PFU. In one aspect, this may involve a heuristic process wherein approaches like trial and error, rule of thumb, or an educated guess are employed.

If the process at block 314 determined not to perform the manual optimization, at block 318, the process performs a greedy optimization, wherein a greedy algorithm is used to select (possible) placements of tokens with PFUs.

At block 320, the process determines whether the optimization is complete. In one aspect, the optimization targets fitting the tokens in the least number of PFUs, and also such that the placed tokens consume the least amount of IMEM memory. This ensures using the least amount of PFUs and IMEM memory in a PFU, thereby consuming the least amount of dynamic power. In one aspect, this can involve confirming that all tokens have been efficiently and logically placed in one or more PFUs. If the process determines the optimization is not complete, the process returns to block 314.

If the process determines the optimization is complete in block 320, the process determines, at block 322, whether the design fits (e.g., whether the CNN after all optimizations will fit in the target CNN processor). If not, at block 324, the process displays a failure message (e.g., a message to the user of the compiler that the compiler was unable to fit the CNN into the CNN processor). At this stage, the user could consider other options like using multiple CNN processor chips in a multi-chip configuration, thereby adding resources.

If the process determines, at block 322, that the design fits, the process then generates, at block 326, machine configuration settings for the CNN processor. These machine configuration settings can include configuration settings for each of the components of the CNN processor (e.g., IMEM_Write, IMEM_Read, CoreCompute, IMEM, etc.)

At block 328, the process displays a success message (e.g., a message to the user of the compiler that the compiler was able to fit the CNN into the CNN processor and generate the appropriate configuration settings).

Figure 4:
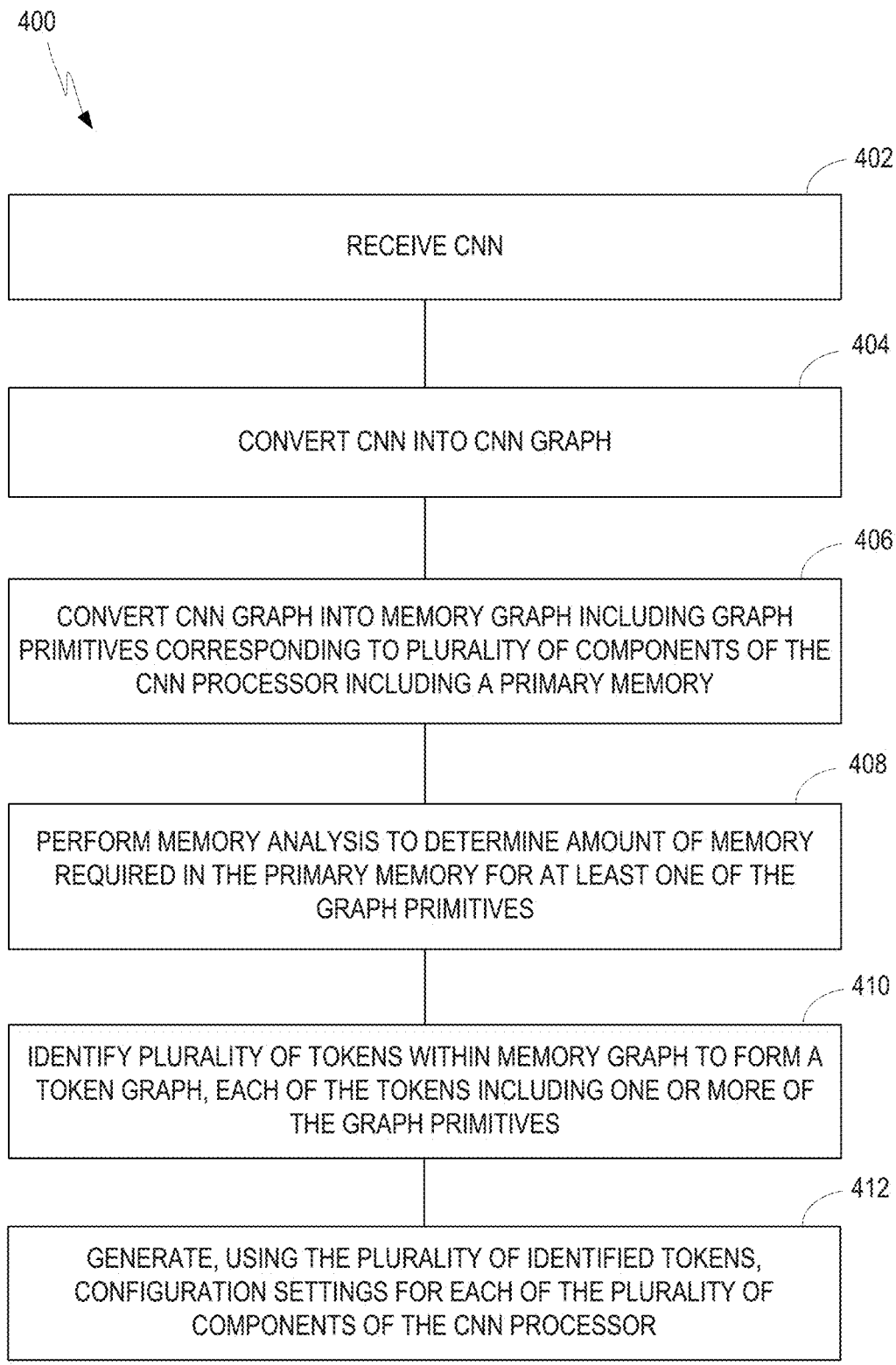
FIG. 4 is a flowchart illustrating another process for a compiler that receives an input CNN and outputs configuration settings for a custom CNN processor based on the input CNN in accordance with some aspects of the disclosure.

FIG. 4 is a flowchart illustrating another process 400 for a compiler that receives an input CNN and outputs configuration settings for a custom CNN processor based on the input CNN in accordance with some aspects of the disclosure. In one aspect, process 400 can be viewed as a simplified version of the process 300 of FIG. 3. In one aspect, the process 400 can be executed on the computing device 102 of FIG. 1 or the computing device 1800 of FIG. 18. In one aspect, the configuration settings can be used to program any of the CNN processors described herein, including, for example, CNN processor 108 of FIG. 1 and CNN processor 200 of FIG. 2.

At block 402, the process starts and receives a CNN. In one aspect, the CNN can be a trained CNN and in the form of a text file that includes all of the details and parameters of the trained CNN.

At block 404, the process converts the CNN into a CNN graph. In one aspect, the CNN graph is a directed acyclic graph (DAG). In one aspect, the input CNN is received as a DAG and the process does not need to convert a text-based version of the CNN into a CNN graph.

At block 406, the process converts the CNN graph into a memory graph including graph primitives corresponding to a plurality of components of the CNN processor including a primary memory. The memory graph can include a finite set of graph primitives (IMEM_Write, IMEM_Read, CoreCompute) corresponding to a plurality of components of the CNN processor, which also includes a primary memory (IMEM). FIGS. 5a and 5b show examples of a CNN graph and a resulting IMEM graph after the conversion. CNN graph primitives such as Cony, BatchNormalization, Relu, and MaxPool with first settings have been converted to IMEM graph primitives such as IMEM_Write, IMEM_Read, and CoreCompute with appropriate second settings. Further details of the conversion process are described below in the sections discussing FIGS. 5a and 5b.

At block 408, the process performs a memory analysis to determine an amount of memory required in the primary memory for at least one of the graph primitives. In one aspect, this memory analysis may be referred to as a memory liveness analysis. In one aspect, this analysis determines the amount of memory needed in the primary memory (IMEM) for each of the graph primitives. This analysis involves analyzing the CNN graph primitives and their settings to determine the appropriate corresponding IMEM graph primitive and the minimum memory needed for that IMEM graph primitive to function properly. In one aspect, for example, the process can determine a minimum number of lines of an image to be stored in the primary memory by the graph primitive, where the image is to be processed by the core compute element. Similarly, the process can also determine not to store the lines of the image other than the minimum number in the primary memory. This has a number of benefits including minimizing the memory required and thereby enabling a CNN to be fit to the CNN processor. Further details of this comprehensive analysis are described below in the discussions of FIGS. 6a, 6b, 7a, 7b, 8-13, 14a, 14b, 14c, and 15.

At block 410, the process identifies a plurality of tokens within the memory graph to form a token graph, where each of the plurality of tokens includes one or more of the graph primitives. In one aspect, this is done by partitioning the IMEM graph into segments that consist of groups of graph primitives, where each segment will be treated as a token. In one aspect, the token is an indivisible unit of the graph primitives as viewed by the compiler. In addition, for this aspect, the token must be placed in one PFU, and thus its contents cannot be spread among multiple PFUs. Among other things, this helps to ensure memory efficiency and timing requirements between components of the CNN processor can be met in order to implement the input CNN. Further details of this conversion to the token graph are described below in the discussion of FIG. 16.

At block 412, the process generates, using the plurality of identified tokens, configuration settings for each of the plurality of components of the CNN processor (e.g., IMEM_Write, IMEM_Read, CoreCompute, IMEM, etc.)

In one aspect, the graph primitives can include a write buffer, a read buffer, and a core compute element.

In one aspect, the core compute element is pre-configured to perform at least one function of the CNN, where the at least one function includes at least one of convolution, batch normalization, pooling, or activation.

In one aspect, the write buffer and the read buffer are sub-components of the primary memory.

In one aspect, the performing the memory analysis to determine the amount of memory required in the primary memory for at least one of the graph primitives includes determining a minimum number of lines of an image to be stored in the primary memory, the image to be processed by the core compute element, and wherein the configuration settings for the core compute element include the minimum number of lines to be stored in the primary memory.

In one aspect, the performing the memory analysis to determine the amount of memory required in the primary memory for at least one of the graph primitives further includes determining not to store the lines of the image other than the minimum number in the primary memory.

In one aspect, the CNN includes a plurality of programmable functional units. In such case, the identifying the plurality of tokens within the memory graph to form the token graph includes identifying groups of the graph primitives to be mapped to one of the plurality of programmable functional units, where each token of the plurality of tokens is a group of the graph primitives to be mapped to one of the plurality of programmable functional units.

In one aspect, the process further includes performing, using a greedy or a heuristic technique, a simulated placement of each token within one of the plurality of programmable functional units to determine an optimized placement. In one aspect, the process further includes repeating the simulated placement to determine the optimized placement.

In one aspect, the process further includes determining, based on the simulated placement, that the CNN in the token graph format will fit within the CNN processor. In such case, the generating, using the plurality of identified tokens, configuration settings for each of the plurality of components of the CNN processor includes generating, based on the determination that the CNN will fit and using the plurality of identified tokens, configuration settings for each of the plurality of components of the CNN processor.

In some aspects, the graph primitives include a plurality of core compute elements. In one such case, the generating, using the plurality of identified tokens, configuration settings for each of the plurality of components of the CNN processor includes generating, using the plurality of identified tokens, configuration settings for the core compute elements such that each of the core compute elements does not store inputs and does not store intermediate tensor values.

In one aspect, wherein the performing the memory analysis to determine the amount of memory required in the primary memory for at least one of the graph primitives further includes determining an expected delay in exchanges of data between at least two of the graph primitives, determining, based on the expected delay, a minimum number of lines of an image to be stored in the primary memory, the image to be processed by a core compute element, and wherein the configuration settings for the core compute element include the minimum number of lines to be stored in the primary memory.

FIG. 5a is a schematic diagram of a directed acyclic graph of an exemplary CNN graph (CNN graph) in accordance with some aspects of the disclosure. In some aspects, this CNN graph can be used in any of the various processes described herein, including, for example, process 300 of FIG. 3 and process 400 of FIG. 4.

It was mentioned previously that the output of a compiler is a physical mapping to a hypothetical PFU. More formally, the output format is called the IMEM graph (e.g., memory graph), which has custom operators. In one aspect, the IMEM graph is implemented in the .onnx file format. In one aspect, the IMEM graph consists of 3 types of nodes: IMEM_WRITE, CORE_COMPUTE, and IMEM_READ to match the PFU architecture. In one aspect, the topology of the IMEM graph can be defined as follows:

(1) IMEM_WRITE must be followed by at least 1 IMEM_READ
(2) IMEM_READ must be followed exactly by 1 CORE_COMPUTE,
(3) CORE_COMPUTE(*) must be followed exactly by 1 IMEM_WRITE (*) The final core compute of an IMEM graph from which the data leaves the PFA chip is not followed by an IMEM_WRITE.

FIG. 5a shows an example CNN graph 500. The CNN graph 500 includes a data path that starts with data 502 provided to a convolution 504, continues to a batch normalization 506, a Relu function 508, a MaxPool function 510, and so on. Each of the components of the CNN graph 500 may include various configuration settings as shown within the corresponding boxes.

FIG. 5b is a schematic diagram of the CNN graph of FIG. 5a after conversion into a memory graph (IMEM graph) 550 in accordance with some aspects of the disclosure. The IMEM graph 550 includes a data path that starts with data 552 provided to a IMEM write buffer 554, continues to an IMEM read buffer 556, a core compute element 558, a IMEM write buffer 560, and so on. Each of the components of the IMEM graph 550 may include various configuration settings as shown within the corresponding boxes.

As to the process of conversion, the compiler runs a series of operations to convert the input, a neural network graph (e.g., CNN graph), into the output, an IMEM graph. To explain the process, a selected model of multiple "passes" over the input are presented, where each pass is tasked with a specific edit. The implementation details are elaborated on below.

In one aspect, the compiler takes in a neural network graph (CNN graph) as its input and generates two data structures from it:

(1) A list of Neural Network Graph operators: nodes;
(2) A key-value map of Neural Network Graph tensors (graph edges in FIG. 2): tmap.

In one implementation, these structures can be created using NVidia's ONNX Graph surgeon. In such case, nodes are a list of neural network graph (ONNX) operators and tensors are either learned parameters or operator inputs. Note that the tensor map may be created using graphsurgeon.Graph.tensors( ). Note that this map can be topologically sorted in place (see graphsurgeon.Graph.toposort).

The compiler works in stages of pass functions that run on the input graph. A pass function is defined as a function that traverses its input graph in a defined order, performs well-defined edits, and outputs an intermediate neural network graph. Intermediate graphs are primarily designated to be inputs to subsequent pass functions; while they are valid .onnx files, they cannot always be used for inference with the ONNX runtime inference engine. Pass functions can be mathematically denoted as f: (list: nodes, map: tmap)->(list: nodes', map: tmap'). Note that the nodes are sorted before inputting to a pass function so that the operators in it are in depth first order.

The order in which the passes are run is also well defined, therefore the first stage compiler can be thought of as a composite function consisting of a series of pass functions that are chained with a specific order, which can be denoted as g( . . . h(f(x)) . . . ) where x is the compiler input graph and g, h, f are the pass functions.

Pass functions can be classified as (1) Operator converters or (2) IMEM_READ/IMEM_WRITE creators.

Within the order of the pass functions of the compiler, high priority is given to those which convert neural network graph operators that are not defined within the list of core compute operations (i.e., add, etc.) to a valid CC operation.

Memory Liveness Analysis

So far, the specifics of IMEM's storage have not been discussed. A significant advantage of the PFA programming model (e.g., the architecture of the CNN processor), both in power consumption and privacy, is the fact that the IMEM generally never stores an entire image, or an entire convolution layer output volume. The IMEM only stores the minimum necessary rows (or lines, as in raster scan lines). The memory liveness analysis, the second primary stage of the compiler, statically calculates the minimum number of lines that needs to be stored. In one aspect, these numbers do not change during the runtime.

For example, if an input tensor to a convolution layer is 13×13×1024 volume (e.g., a 13×13 map with 1024 channels), IMEM would only need to store n×13×1024 portion of the input tensor, where n<13. The value of "n" depends on the type of convolution such as a regular convolution or a convolution followed by up-sampling/down-sampling, a 1×1 convolution or any other combination.

The upcoming FIGS. 6a, 6b, 7a, 7b, 8, 9 and their descriptions will show how a CC performs assigned operations in order to clarify memory requirements. At each example, the disclosure will demonstrate how many input lines the CC operation requires to compute 1 line of output. This is a function of a CC operator and it is denoted herein as lines_needed(CC). Note that when the disclosure references a CC's memory requirements, this refers to how much space they need reserved in IMEM to be able to write their output.

Figure 6B:
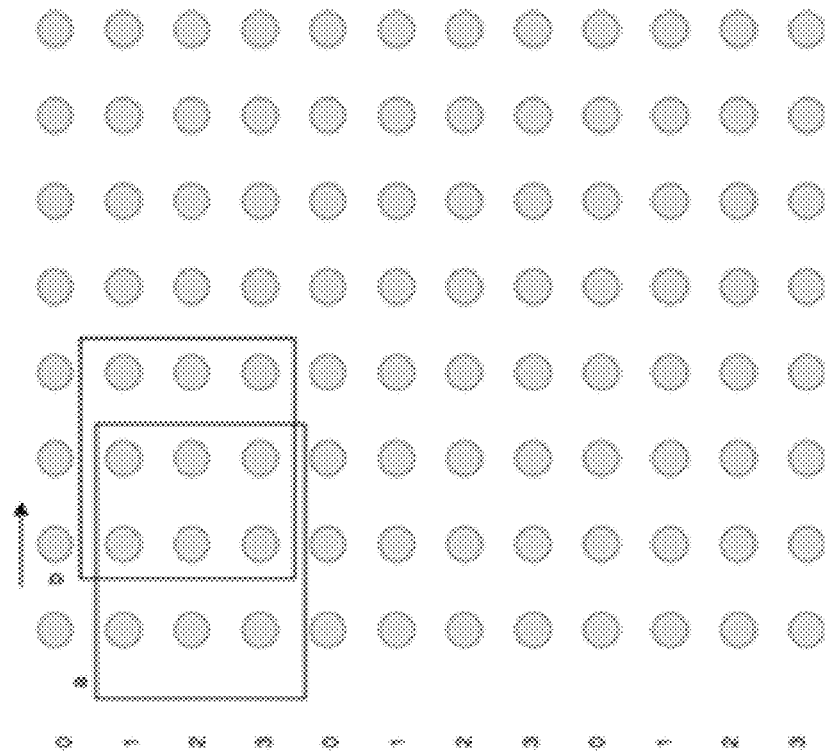
FIG. 6*b* is a schematic diagram illustrating processing associated with the simple strided convolution for a second row of the input tensor of FIG. 6*a* in accordance with some aspects of the disclosure.
Figure 6A:
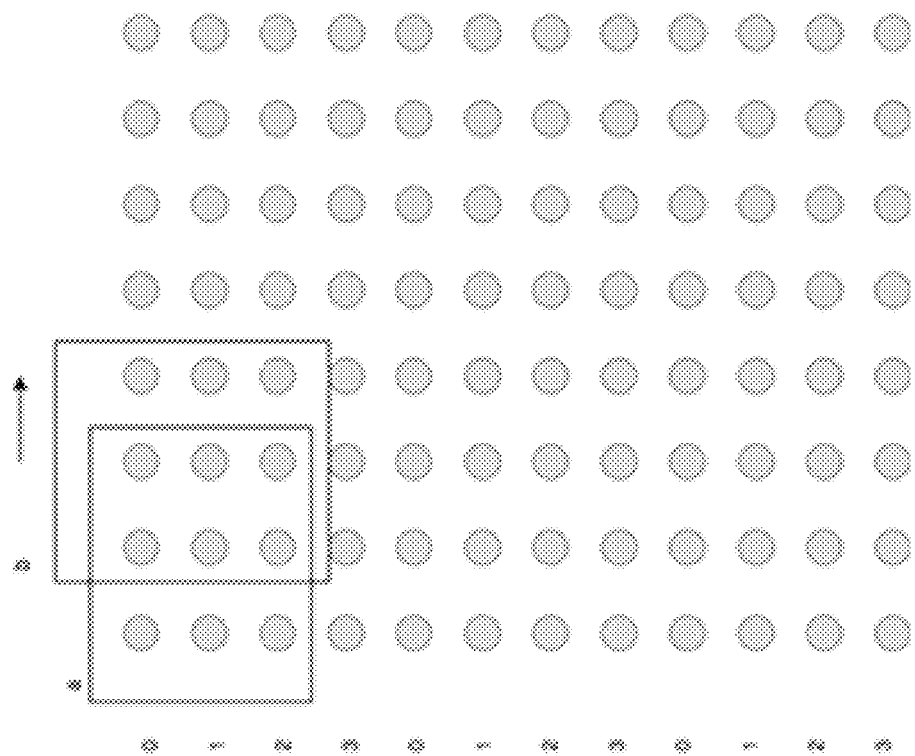
FIG. 6*a* is a schematic diagram illustrating processing associated with a simple strided convolution for a first row of an input tensor to determine memory requirements for an IMEM buffer in accordance with some aspects of the disclosure.

FIG. 6a is a schematic diagram illustrating processing associated with a simple strided convolution for a first row of an input tensor to determine memory requirements for an IMEM buffer in accordance with some aspects of the disclosure. This is the case of a n×n strided convolution, and more specifically, a 3×3 convolution with a stride of 1. The 3×3 convolution filter takes the dot product of its parameters and the values of the input tensor indexed from [0, 0] to [2, 2] (shown with a in FIG. 6a), and slides by stride 1 to the next portion of the input tensor indexed from [1, 0] to [3, 2] (shown with b in FIG. 6a). The convolution filter passes over all values of the input tensor until the row is complete, then moves onto the next row to perform dot product in the same manner (as shown in FIG. 6b).

FIG. 6b is a schematic diagram illustrating processing associated with the simple strided convolution for a second row of the input tensor of FIG. 6a in accordance with some aspects of the disclosure. Within this operation, IMEM only needs 3 rows of data that the filter maps to. Hence, the minimum number of rows that needs to be stored in the IMEM can be formulized as n, where n is the size of the convolution filter, and therefore lines_needed(CC)=n.

Figures 7A, 7B:
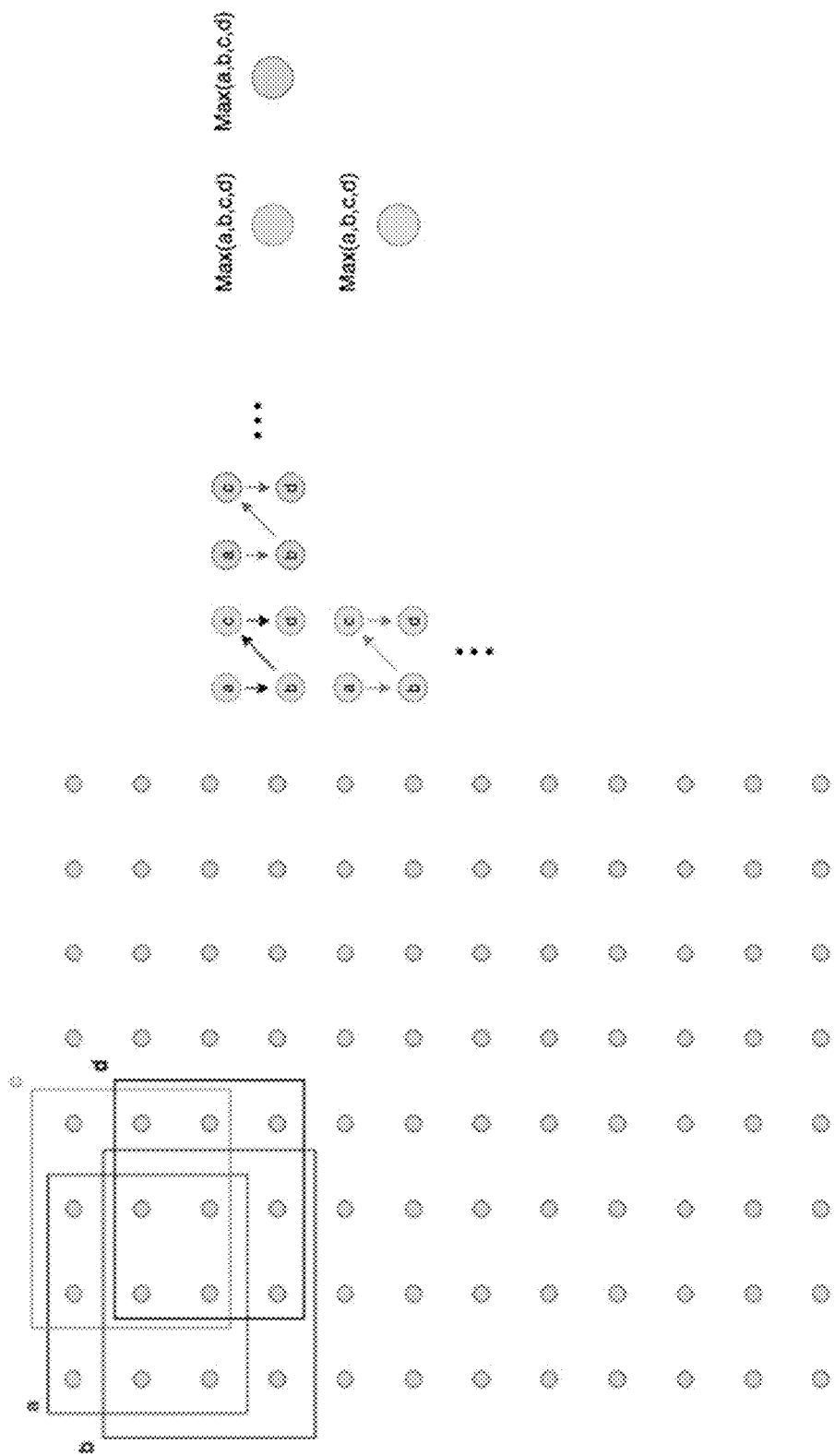
FIG. 7*a* is a schematic diagram illustrating processing associated with a max pooled convolution for groups a, b, c, and d of an input tensor to determine memory requirements for an IMEM buffer in accordance with some aspects of the disclosure.
FIG. 7*b* is a schematic diagram illustrating processing associated with the max pooled convolution for groups a, b, c, and d of the input tensor of FIG. 7*a* in accordance with some aspects of the disclosure.

FIG. 7a is a schematic diagram illustrating processing associated with a max pooled convolution for groups a, b, c, and d of an input tensor to determine memory requirements for an IMEM buffer in accordance with some aspects of the disclosure. The example presented here is of a core computer (CC) performing a n×n convolution with a stride of 1, followed by an m×m maxpool. This example will use n=3, m=2. The 3×3 convolution filter takes the dot product of its parameters and the values of the input tensor indexed from [0, 0] to [2, 2] (shown with a in FIG. 7a), slides by 1 stride down to the next portion of the input tensor indexed from [0, 1] to [2, 3] (shown with b in FIG. 7a), slides diagonally to the next portion indexed from [1, 0] to [3, 2] (shown with c in FIG. 7a) to perform dot product in the same manner until sufficient input values have been mapped to perform max pooling (shown with d in FIG. 7a).

In n×n max pooled convolutions, the convolution filter does not pass over all values within the first row of the input tensor like in simple strided n×n convolutions, since a max pooling operation is performed as soon as the convolution finishes, which requires n×n portion of the intermediate tensor to be filled. Instead, the filter slides diagonally upwards once all n values in the first column of the intermediate tensor are filled, and it continues to fill the next column (shown in FIG. 7b).

FIG. 7b is a schematic diagram illustrating processing associated with the max pooled convolution for groups a, b, c, and d of the input tensor of FIG. 7a in accordance with some aspects of the disclosure. Within this operation, the IMEM will store 4 rows that the filter maps to within the 2 steps of the convolution. Hence, the minimum number of rows that needs to be stored in the IMEM can be formulized as n+1, and therefore lines_needed(CC)=n+1.

Figure 8:
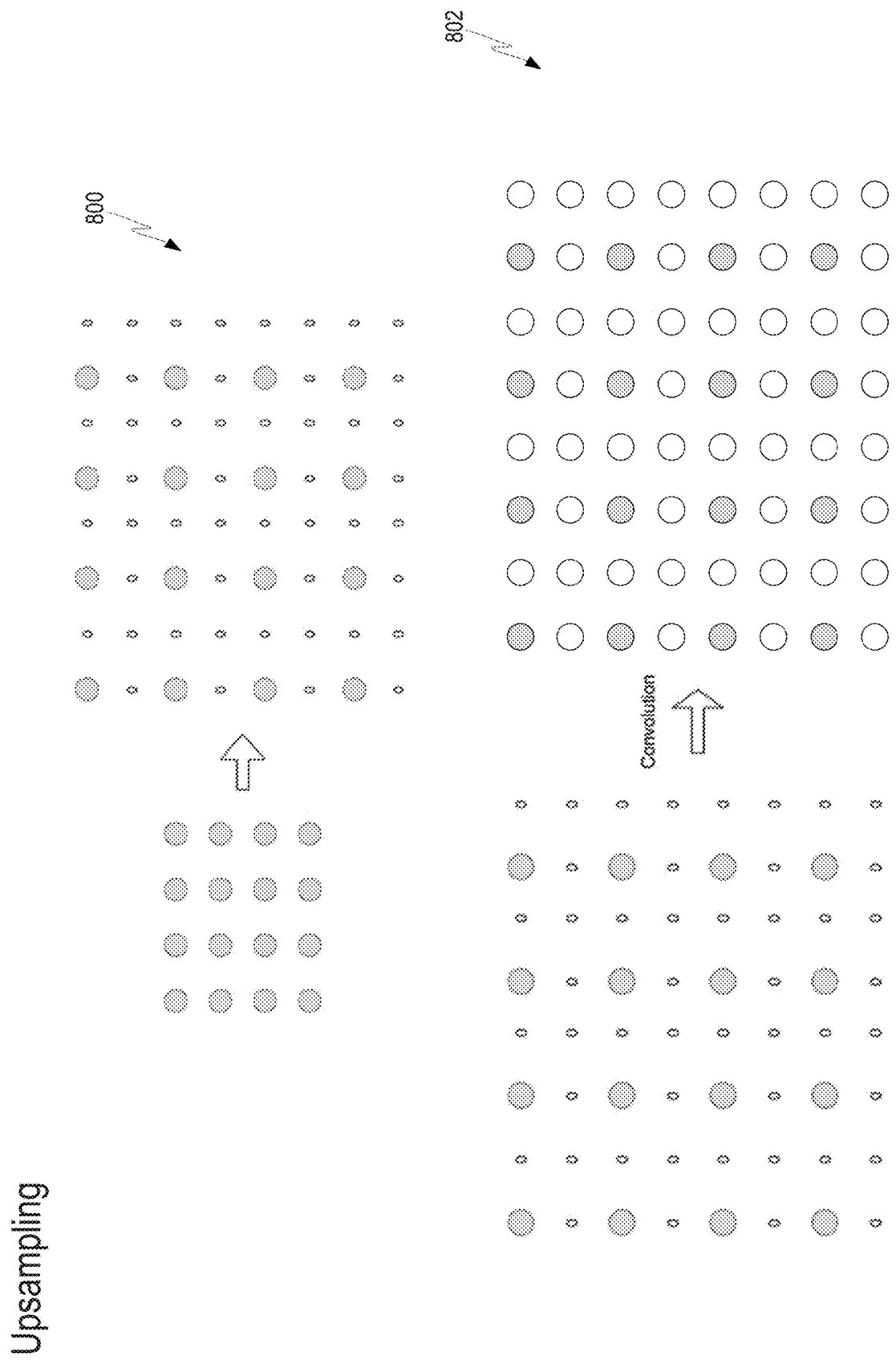
FIG. 8 is a schematic diagram illustrating processing associated with upsampling and convolution of an input tensor to determine memory requirements for an IMEM buffer in accordance with some aspects of the disclosure.

FIG. 8 is a schematic diagram illustrating processing associated with upsampling and convolution of an input tensor to determine memory requirements for an IMEM buffer in accordance with some aspects of the disclosure. For demonstration purposes, an example of a CC performing upsampling by inserting zeros followed by a convolution is shown in FIG. 8. At 800, samples valued at 0 are inserted into the tensor between the original samples, and this operation is followed by an n×n convolution 802 in which both newly inserted samples and original samples change their values. Within this operation, the IMEM will store 3 rows that the filter maps to within the n×n convolution. Hence, the minimum number of rows that needs to be stored in the IMEM can be formulized as n, with n being the size of the convolution filter, and therefore lines_needed(CC)=n.

Figure 9:
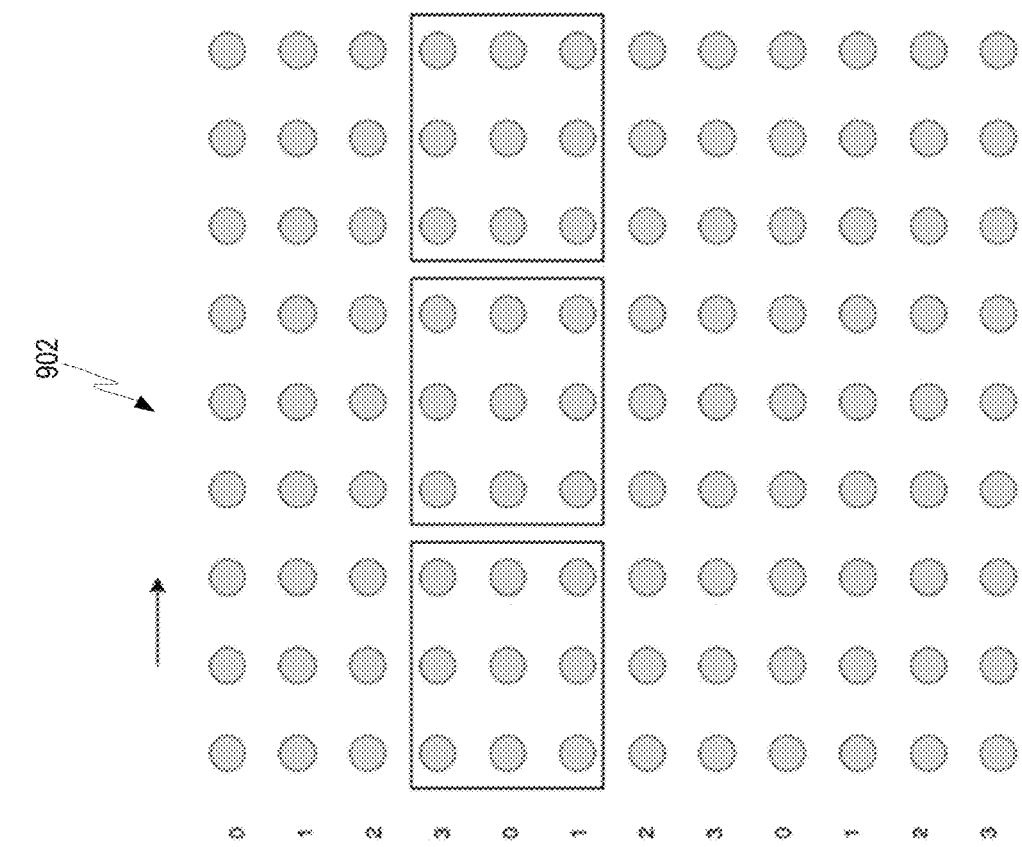
FIG. 9 is a schematic diagram illustrating processing associated with a 1×1 convolution of an input tensor to determine memory requirements for an IMEM buffer in accordance with some aspects of the disclosure.
Figure 9:
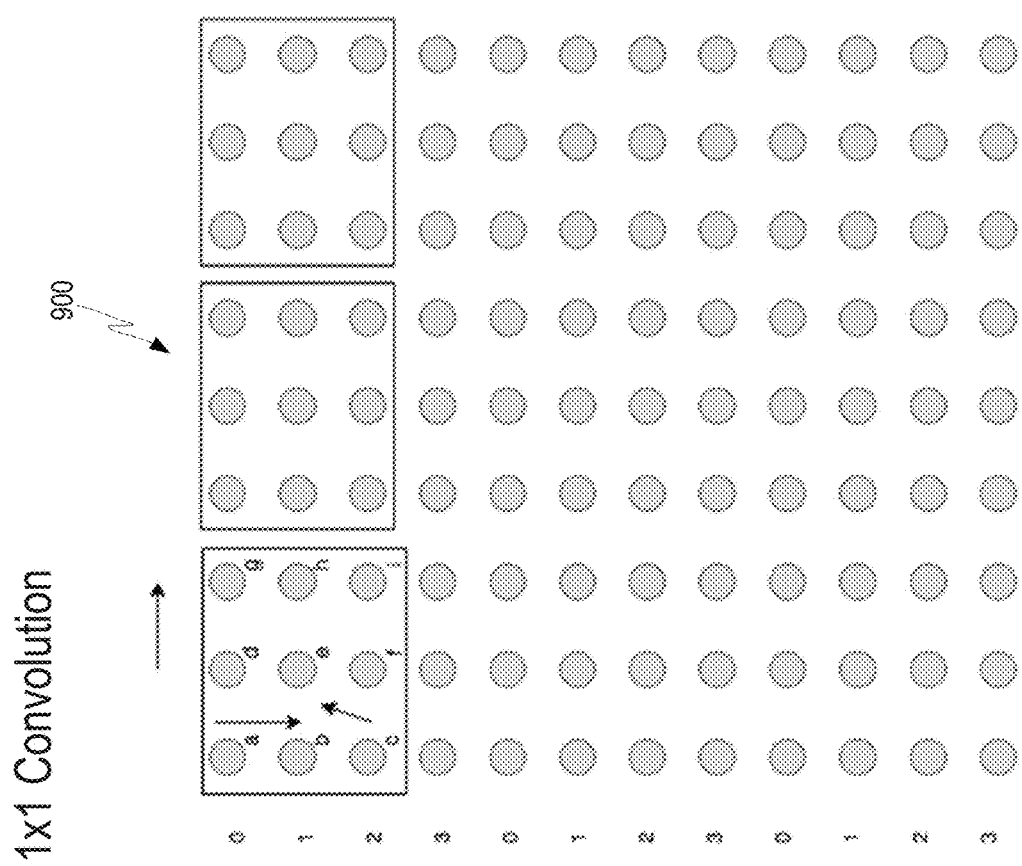

FIG. 9 is a schematic diagram illustrating processing associated with a 1×1 convolution of an input tensor to determine memory requirements for an IMEM buffer in accordance with some aspects of the disclosure. For demonstration purposes, an example of a CC performing a 1×1 convolution with a stride of 1 is given. At each step of the convolution, the 1×1 convolution filter takes the dot product of its parameters and the values of the input tensor (shown with [a, b, c, . . . , i] at 900 in FIG. 9) indexed from [0, 0] to [2, 2] and slides by 3 strides to the next portion of the input tensor indexed from [2, 0] to [4, 2] (shown at 900 in FIG. 9). The convolution filter passes over all values of the input tensor until the row is complete, then moves onto the next row by 3 strides to perform dot product in the same manner at 902. Within this operation, the IMEM will store 3 rows that the filter maps to within a step of the convolution. Hence, the minimum number of rows that needs to be stored in the IMEM can be defined as 3 when n=1, with n being the size of the convolution filter, and therefore lines_needed(CC)=3.

Graph Splits and Timing

The examples above are simple cases where the memory requirement of an IMEM write buffer (IMEM_WRITE) is a direct function of a single core compute element's (CCs) assigned operations. In certain cases, such as for residual blocks and inception modules, where there is a layer split in the IMEM graph, the memory requirements change as there is a delay in computation that results due to depth differences.

In order to demonstrate the delay caused by memory requirements and visualize the synchronization between CCs, timing tables are introduced here. Each row i in a timing table represents a time step, and each column j represents a CC. At each time step i, if Cj is performing its assigned operations, then that cell Cij is populated by information regarding the inputs/output of the operation. Specifically:

$$C_{ij} = C_n(x-y), z$$

$C_n(x-y)$: The range of lines $C_j$ consumes from the previous CC, i.e., $C_n$'s output, n can be a set of CCs z: At the end time step i, $C_j$ outputs the $z^{th}$ line of its output. (Note that z can be a range of lines. As an example, in 1×1 per time step, ⅓ of the 3 lines are generated. Only at the end of the 3rd time step, all 3 lines are fully generated, hence lines produced will be denoted as 1-3 for those 3 timesteps.)

If a cell is empty that means that CC is not performing operations at that time step.

In one aspect, a time step can be defined as the unit of time it takes for all three of the following to complete:
 (1) IMEM_READ to fully load its assigned memory from IMEM to CC;
 (2) CC to finish computing one line (*) of its output; and
 (3) IMEM_WRITE to finish writing one line (*) of CC's output to IMEM.
 (*) except in the case of a 1×1 convolution where ⅓ of a line is computed in each time step.

In practice, a CC will emit its output to IMEM in smaller chunks than a line. However, the process can ignore these time granularities, and instead, focus on one line as a chunk unit. It is also the case that different CCs handle different computations. Therefore, time steps are not units of equal cycles, but a synchronization primitive defined by operation semantics.

Figure 10:
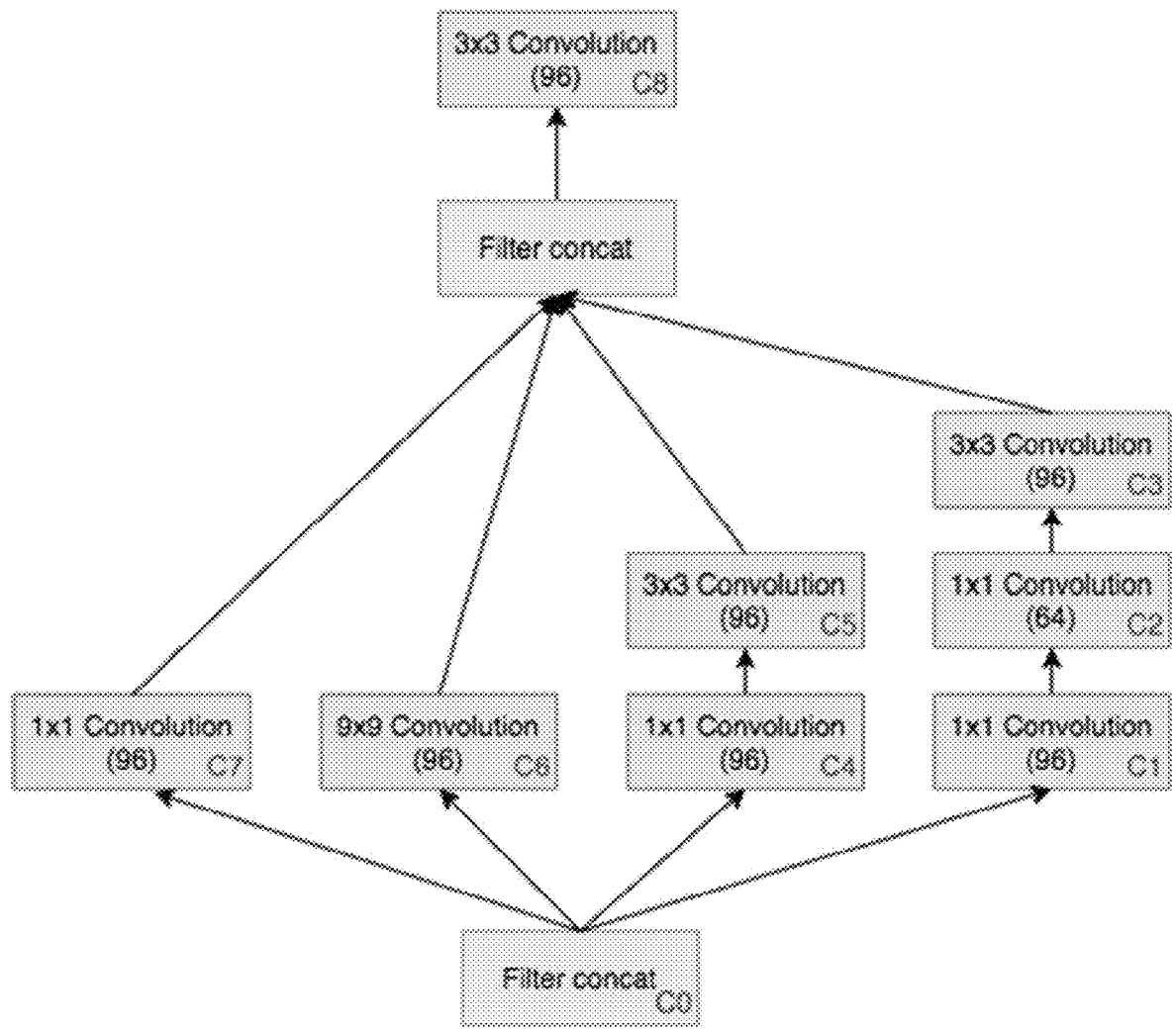
FIG. 10 is a schematic diagram illustrating processing associated a first memory graph split and timing to determine memory requirements for an IMEM buffer in accordance with some aspects of the disclosure.

FIG. 10 is a schematic diagram illustrating processing associated a first memory graph split and timing to determine memory requirements for an IMEM buffer in accordance with some aspects of the disclosure. Aspects of this figure will be discussed in greater detail below.

FIG. 11 is a table illustrating timing for the first memory graph split of FIG. 10 in accordance with some aspects of the disclosure. Aspects of this figure will be discussed in greater detail below.

Figure 12:
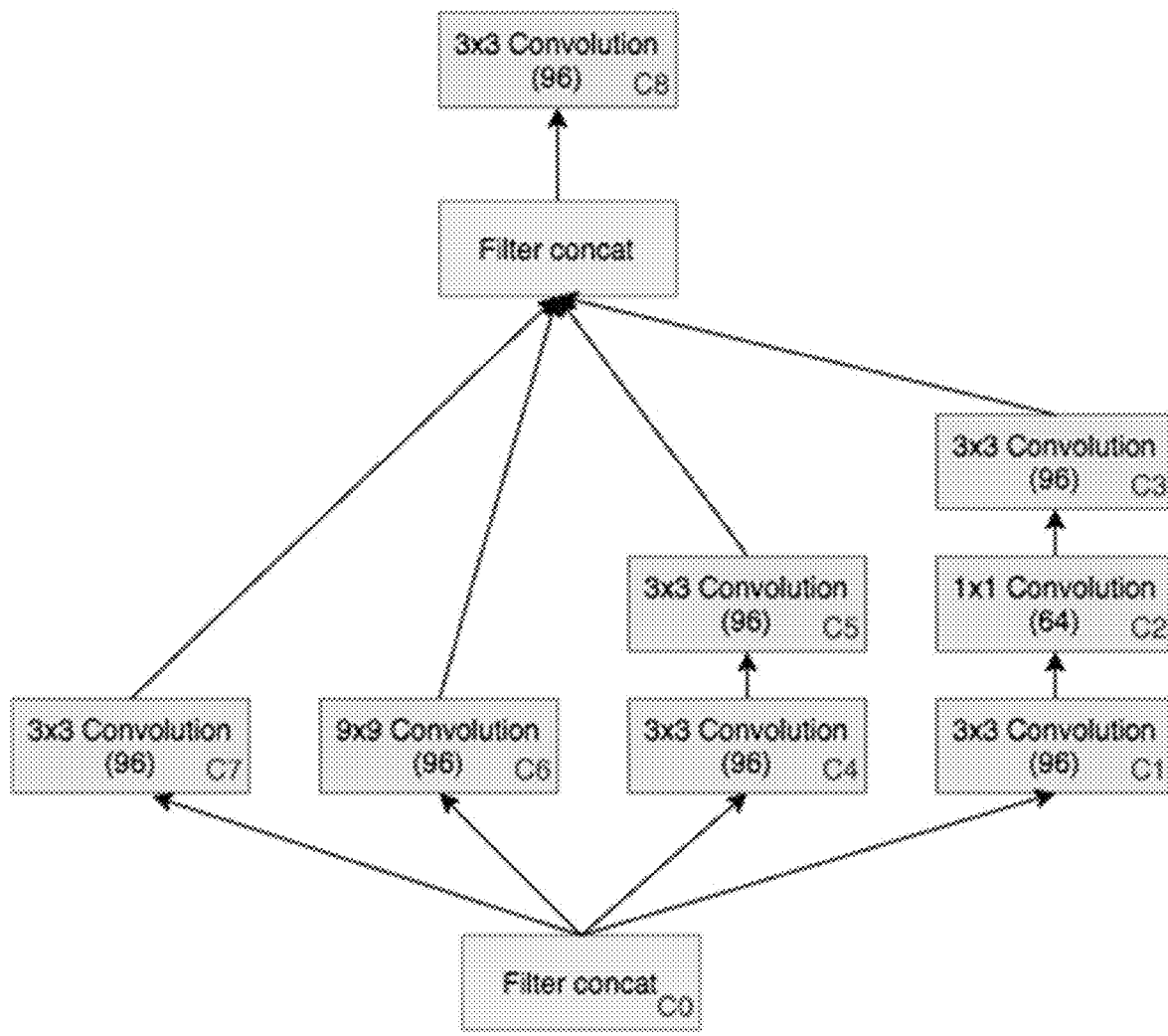
FIG. 12 is a schematic diagram illustrating processing associated a second memory graph split and timing to determine memory requirements for an IMEM buffer in accordance with some aspects of the disclosure.

FIG. 12 is a schematic diagram illustrating processing associated a second memory graph split and timing to determine memory requirements for an IMEM buffer in accordance with some aspects of the disclosure. Aspects of this figure will be discussed in greater detail below.

FIG. 13 is a table illustrating timing for the second memory graph split of FIG. 12 in accordance with some aspects of the disclosure.

Timing tables are useful for determining memory requirements in split conditions. In the neural network layers shown in FIGS. 10 and 12, data flows from C0 upwards. Timing tables can be used to calculate the memory requirements of C0.

It is useful to discuss how CCs stop and stall, which is crucial to understand the delays in the timing tables. First, CCs must generally wait for all input data to be available in IMEM before being able to start computing. So they can stall because of a lack of available input. This is called input lag.

This input data is checked and loaded by the CC's IMEM read buffer (IMEM_READ). Therefore, IMEM_READs, by the virtue of checking if all input data is available, can make a CC start or stall its operations. When an IMEM_READ loads all necessary data into a CC and that input is no longer needed, it can mark those memory segments as consumed.

Each CC also has an assigned memory segment in IMEM to write its outputs. The CC's can also stall because of a lack of space to write outputs in its assigned memory segment. This is called memory lag. This memory segment works as a cyclic buffer (e.g., if full, the newest output replaces the oldest output). Having valid space in the memory segment is defined as either having empty space, or as having data lines that can be overwritten. In order to overwrite a line, it must be marked as "consumed" by IMEM_READs that read from it. A memory lag may cause cascading stalls. If a downstream CC stalls, by the virtue of it not consuming and marking data from its predecessors, those predecessors will also start to stall due to memory lag, as they won't have space to write their outputs. This stalling can cascade backwards.

Simple Delay

In the PFU, IMEM_READs control synchronization between CCs by waiting for data, and by the virtue of checking if all input data is available, they can make a CC start or stall its operations.

First, the timing table of FIG. 13 (and corresponding graph split of FIG. 12) is analyzed, while assuming only operations of C0 and C1 exist. The initial delay of C1 between timesteps 1 to 3 is first discussed. From the first column of the table of FIG. 13, one can see that C1 is not performing any operations in its first 3 time steps. Since C1 is a 3×3 convolution, it needs lines C0(1-3) to be loaded in IMEM for its computation. C0 emits one line per time step. C0's 3rd line of output is being computed during step 3, and is fully available at the beginning of time step 4. At timestep 4, C1's IMEM_READ recognizes that all necessary C1 inputs, C0(1-3) have been written to IMEM. The IMEM_READ then enables C1 to start its computation by loading data into it.

The fact that C1 only starts at step 4 also demonstrates an important constraint regarding C0's memory requirements. It is known that C1 uses lines C0(1-3) during time step 4. If C0 had a memory segment of only 3 lines, it would not be able to overwrite line 1 as that line would not be consumed yet by C1. Therefore, C0 would have to stall. In order for it not to stall, it needs one extra line of memory segment. This means it can write its 4th line of output while C0(1-3) is being consumed.

Therefore, the actual memory segment requirement of C0 is lines_needed(C1)+1. In one aspect, this holds for all memory requirements where there are no splits.

Split Delay

When the assumption that only C0 and C1 exist is removed, and the whole network layer in FIG. 12 is considered, it can be realized that C0's memory requirement cannot be reduced to a function of a single CC. When a CC is the beginning point of a layer split, the process needs to consider all following CCs of it, including the CC of convergence.

To consider the memory requirement of a CC that is at the beginning of the split, the process needs to consider the network in its entirety, consider all the points of convergence of all the paths, and the memory associated with them. Note that points of convergence can be of multiples, even though it is not denoted in the examples above. Therefore, in FIG. 12, where the CC of convergence is C8 and the beginning point is C0, the process needs to consider all paths from C0 to C8.

Let's focus on the relationship between C7 and C8. This is the simple delay situation described in the previous section. Therefore, C7 has a 4-line memory segment assigned for its output. If C8's only input was C7, we would see C8 starting its computation at time step 7. However, C8's input depends on the output of the last convolution operation of each layer (C3, C5, C6 and C7 in the timing table of FIG. 13). C8's IMEM_READ will not consume C7(1-3) until all other C3, 5, 6(1-3) are also available. Since C7(1-3) is not being consumed (C8's input lag) and C7's assigned memory segment is already full (C7's memory lag), it is observed that C7 stalls until time step 13. It is only at time step 13 that C3(1-3) and C6(1-3) are available, and so this is when C8 can start. With C8's start, the previously stalled C7 and C5 are allowed to continue their operations. C5 and C8 have the exact same relationship as C7-C8, C5 stalls at step 11. C5's stall due to C8's input lag causes a cascaded stall to C4.

After step 13, it is observed that there are no stalls anymore. This can be considered the point where the pipeline is full. All CCs will continue to be active without delays, unless at some future point, C8 faces a lag and causes another cascaded stall.

It is important to note that all the delays and cascaded stalls create an extra memory requirement for C0. At time step 13, C6 requires C0(4-12). This means C0's 4th line of output must be preserved in IMEM until timestep 13. C0 needs a big enough memory so that line 4 won't be overwritten. Here, it is observed how delays in a split graph directly contribute to the memory requirements of the beginning point. Therefore, older outputs need to be kept in memory until the pipeline is full and all CCs are active. In fact, to determine the actual memory segment requirements of C0, one must look at all of C0's direct consumers at time step 13, and observe what's the lowest and highest lines required from C0. That determines the size of the memory segment buffer. The memory requirement is formalized in the following section.

Closed Form Line Calculation

Each path Pi is a list of CCs from the beginning point and merging at the CC of convergence. The beginning point and the CC of convergence are not included in the path, only the intermediate CCs. Pi[0], the first CC in the path, is the immediate child of the beginning point. When there is a single path, this is equivalent to the simple delay scenario.

For the two scenarios, simple delay and split delay can be computed as follows:
(1) Simple delay: total_lines_needed=lines_needed $(P_{i[0]})+1$
(2) Split delay: total_lines_needed=max(lines_needed $(P_{i[0]})+\Delta_{delay}(P_i)+1)$ Where:

$\Delta_{delay}(P_i)$ = the difference between path $P_i$ and the longest of all paths = max_over_all _paths_$P_j$(path_delay($P_j$)) − path_delay($P_i$)

lines_needed($P_{i[0]}$) = # of input lines required from the beginning point, for $P_{i[0]}$ to compute 1 unit of its output (1) For a non-pooling, non-cyclic and non-upsampling n×n convolution (simple strided):
Lines needed=n*
(2) For a n×n convolution followed by a pooling (max pooled convolution):
Lines needed=n+1
(3) For an upsampling, non-cyclic, n×n convolution (upsampling):
Lines needed=n
* exception where n=1, lines needed=3

The total_lines_needed are raised to the closest multiple of IMEM_MEM_BANK. IMEM_MEM_BANK is a number which is the smallest multiple which allowed to be addressed IMEM.

Final Lines =

$$\text{IMEM\_MEMORY\_BANK} \cdot \text{ceil}\left(\frac{\text{total\_lines\_needed}}{\text{IMEM\_MEMORY\_BANK}}\right)$$

Assume CC input is a volume where:

$V$=(number of rows)·(number of columns)·(number of channels)

Then, the total memory requirement, in number of words, is:

Total memory=(number of columns)·(number of channels)·(final lines)

Partitioner

The output of the memory analysis stage (e.g., stage 308 in FIG. 3 and stage 406 in FIG. 4) is an IMEM graph that could fit on an infinite PFU. Real PFUs as seen in FIG. 2 have limits on the number of CCs, IMEM size, and external connections that they can have. Therefore, in one aspect, an IMEM graph must be partitioned into segments that could map to physical PFUs. The partitioner is a program (or stage of the compiler) that segments the memory analysis output, the IMEM graph, into separate PFUs.

In order to abstract away the partition logic, it is useful to have interchangeable nodes in the target graph. These interchangeable units can be called partition tokens. They are sets of IMEM graph elements. Partition tokens are indivisible units for the sake of the partition algorithm (e.g., the compiler). In one aspect, a token must be placed in one PFU, such that its contents cannot be spread among multiple PFUs. Tokens can have various shapes as enumerated in FIGS. 14a, 14b, 14c, and 15.

Figure 14A:
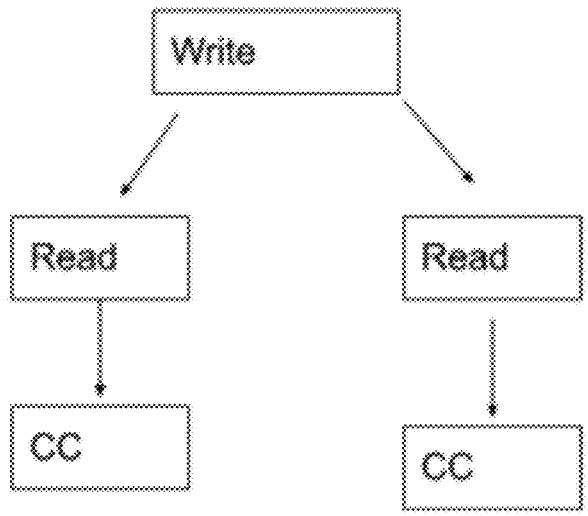
FIG. 14*a* is a schematic diagram illustrating a token shape for a split in a memory graph in accordance with some aspects of the disclosure.

FIG. 14a is a schematic diagram illustrating a token shape for a split in a memory graph in accordance with some aspects of the disclosure. The split occurs at the IMEM write where each branch goes to a IMEM read and then a CC.

Figure 14B:
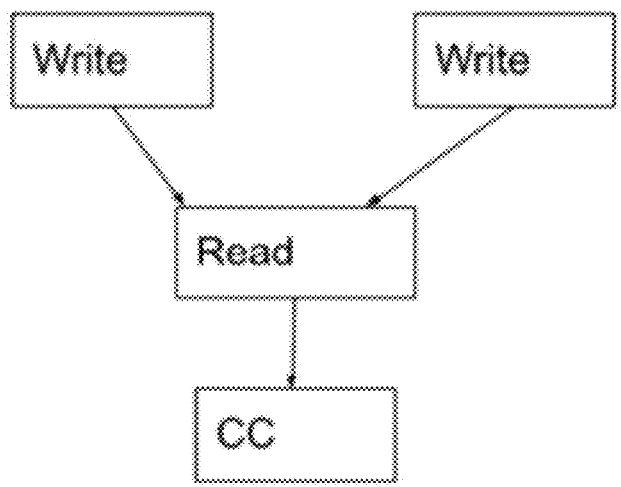
FIG. 14*b* is a schematic diagram illustrating a token shape for a merge in a memory graph in accordance with some aspects of the disclosure.

FIG. 14b is a schematic diagram illustrating a token shape for a merge in a memory graph in accordance with some aspects of the disclosure. The merge occurs as the output of two IMEM writes converges to a IMEM read and then a CC.

Figure 14C:
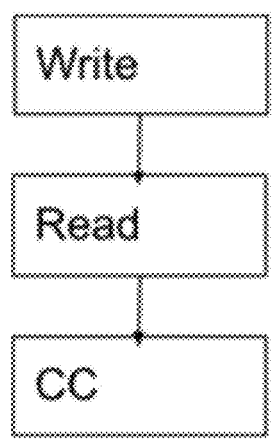
FIG. 14*c* is a schematic diagram illustrating a token shape for a "vanilla" in a memory graph in accordance with some aspects of the disclosure.

FIG. 14c is a schematic diagram illustrating a token shape for a "vanilla" in a memory graph in accordance with some aspects of the disclosure. The "vanilla" shape consists of a straight-line type shape where an IMEM writes goes to a IMEM read which goes to a CC.

Figure 15:
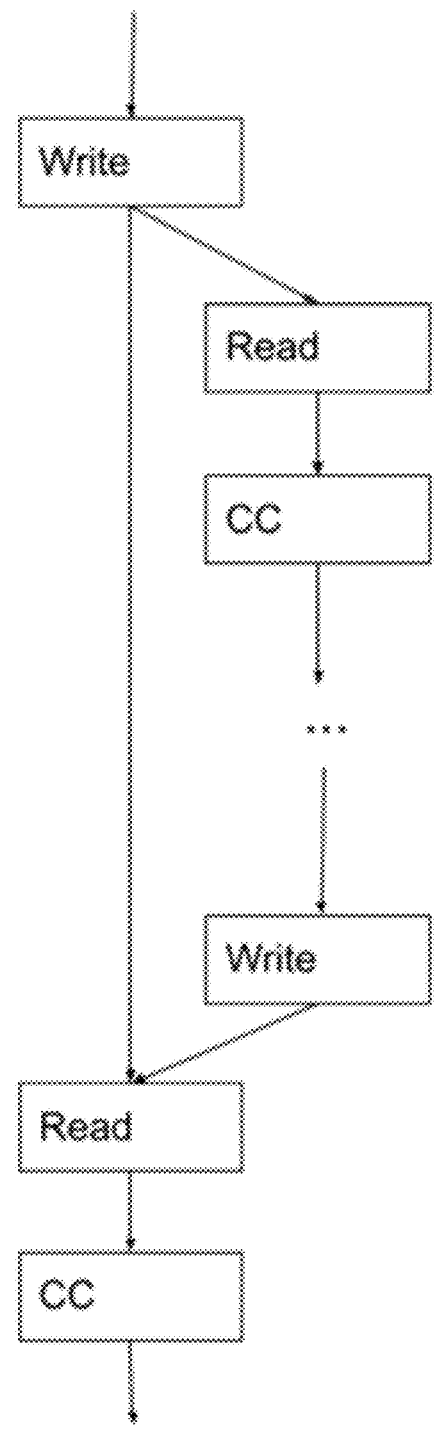
FIG. 15 is a schematic diagram illustrating a token shape for a crescent in a memory graph in accordance with some aspects of the disclosure.

FIG. 15 is a schematic diagram illustrating a token shape for a crescent in a memory graph in accordance with some aspects of the disclosure. The crescent shape starts with an IMEM write where the output splits and a first leg of the split extends to a read, a CC, and so on, and to a write which goes to a read from which the second leg of the split goes directly to.

Figure 16A:
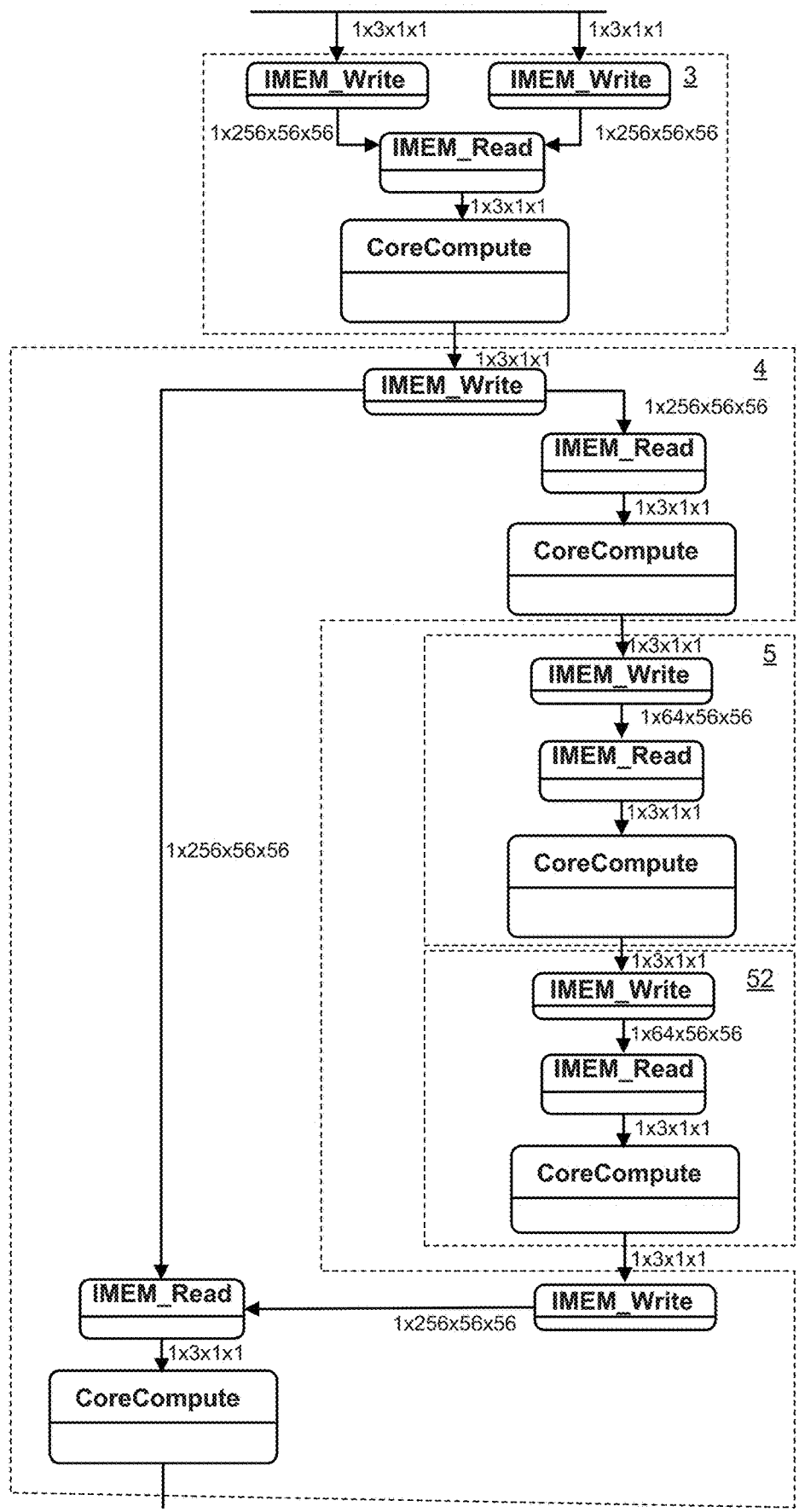
FIG. 16*a* is a schematic diagram illustrating tokens formed on a memory graph to form a token graph in accordance with some aspects of the disclosure.
Figure 16B:
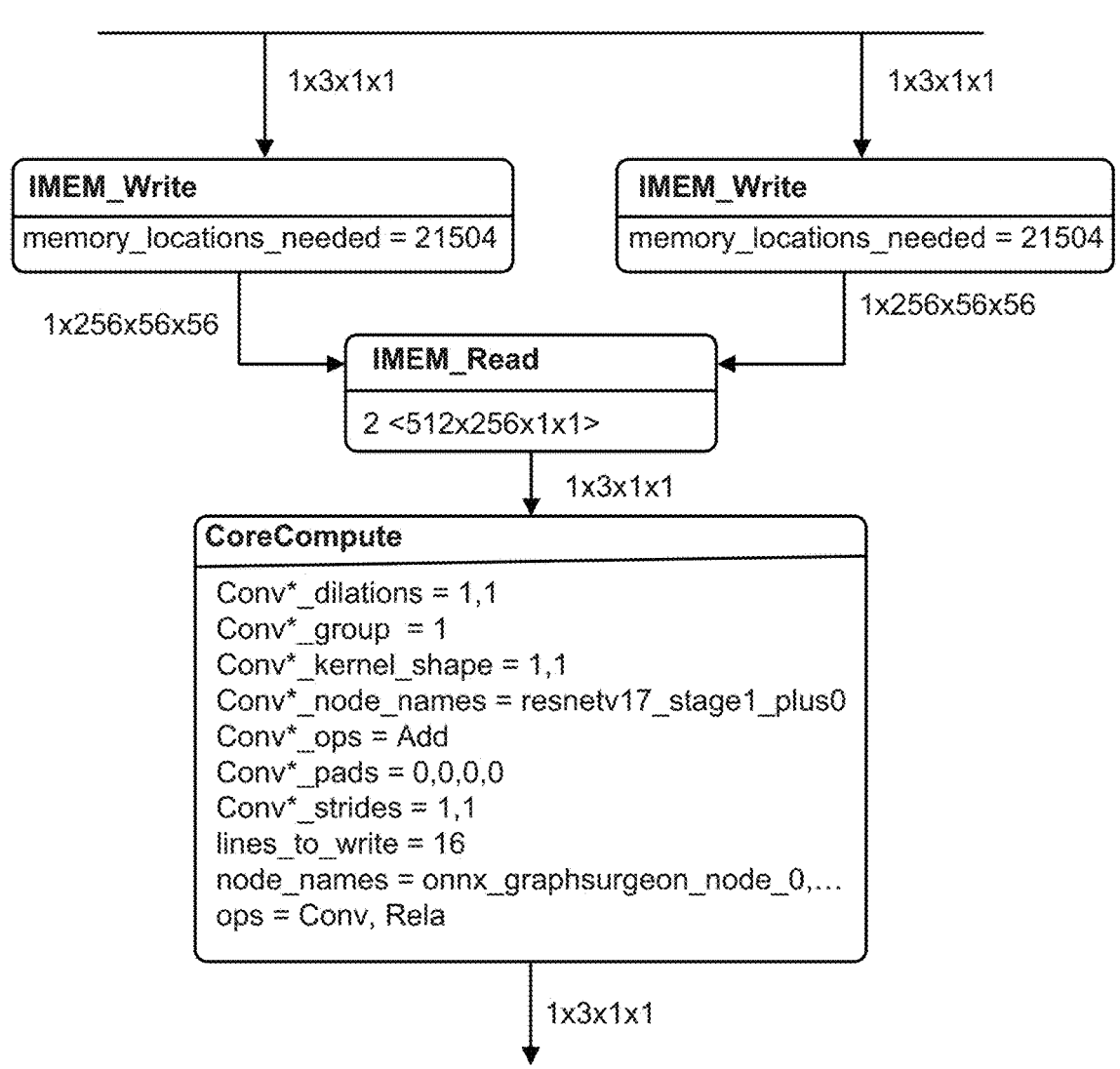
FIGS. 16*b*, 16*c*, 16*d*, and 16*e* are schematic diagrams illustrating individual tokens formed on a memory graph to form the token graph of FIG. 16*a*.
Figure 16C:
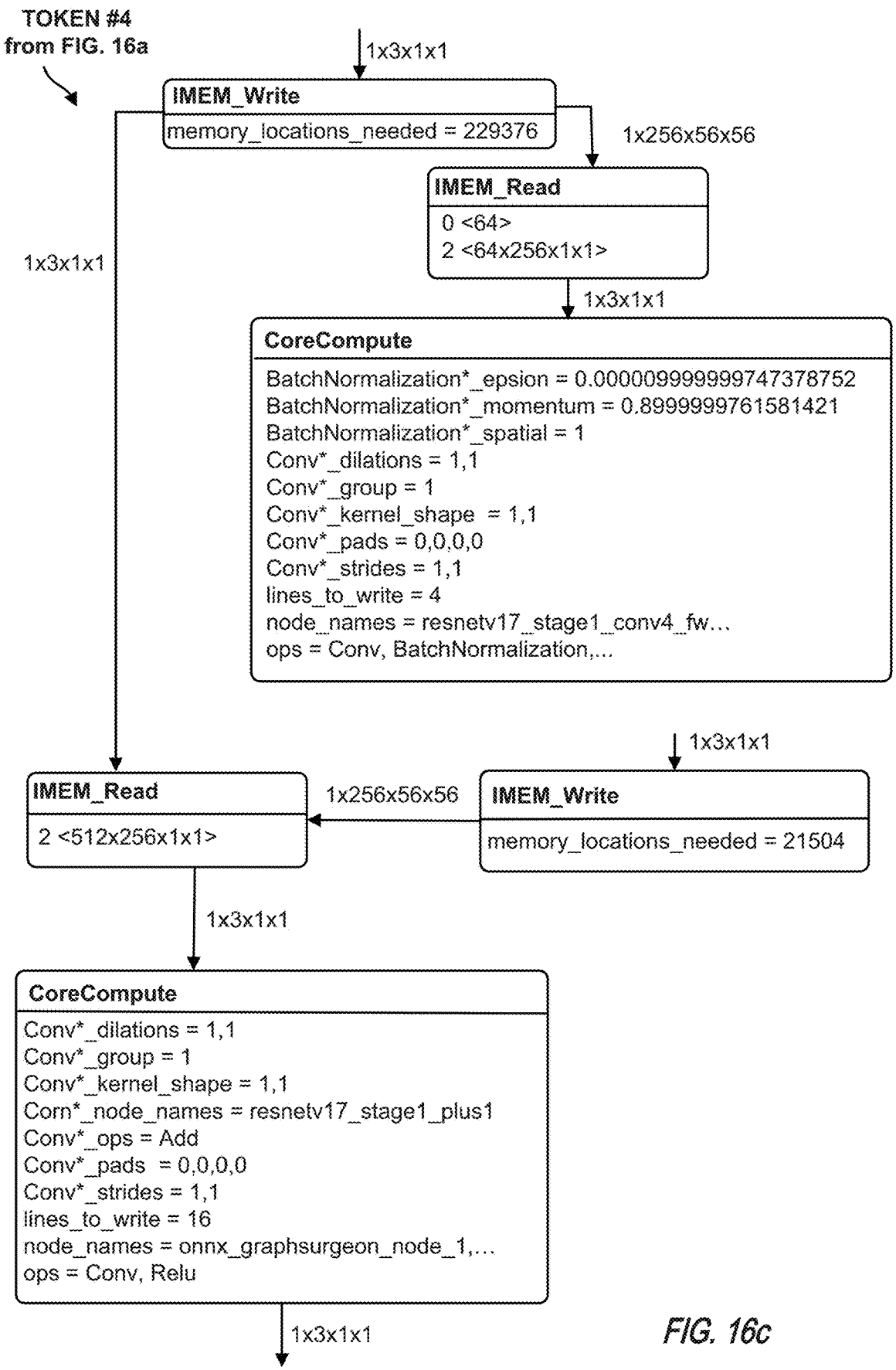
Figure 16D:
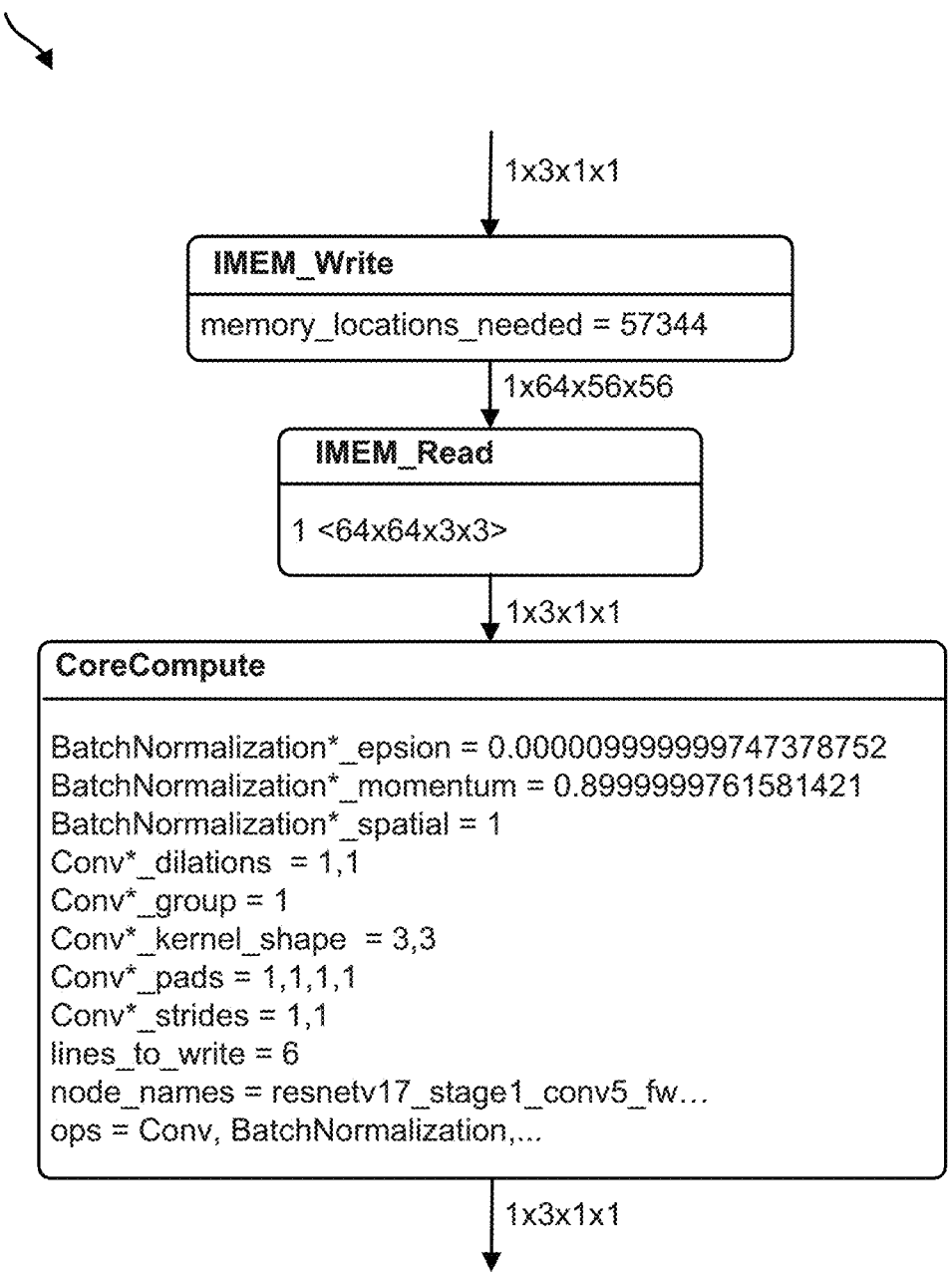
Figure 16E:
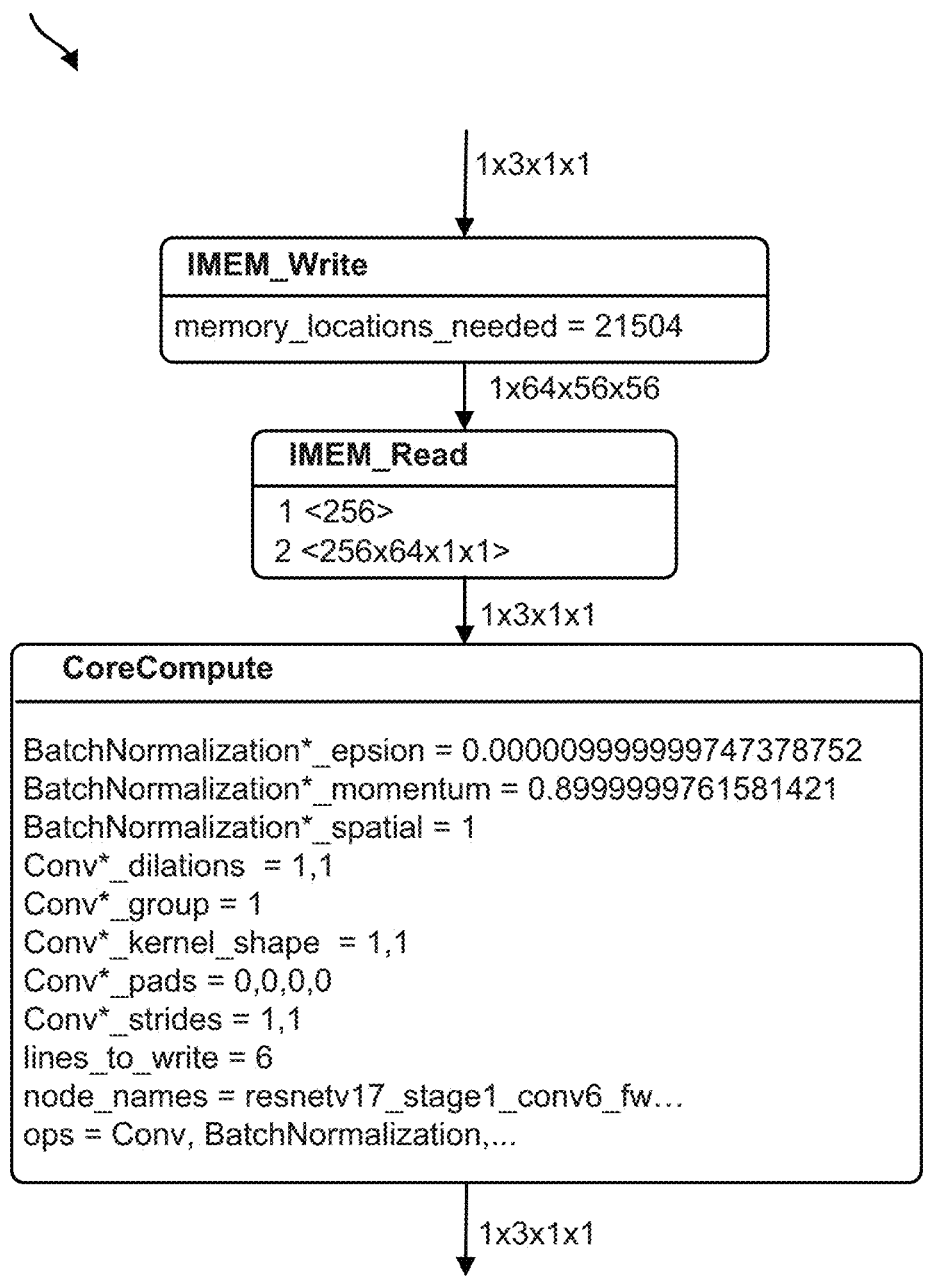

FIG. 16a is a schematic diagram illustrating tokens (3, 4, 5, 52) formed on a memory graph to form a token graph in accordance with some aspects of the disclosure. FIGS. 16b, 16c, 16d, and 16e are schematic diagrams illustrating individual tokens (3, 4, 5, 52) formed on a memory graph to form the token graph of FIG. 16a, and show additional details (e.g., configuration settings) for each of the IMEM graph primitives. In this stage, the IMEM graph can be converted into a token graph. The IMEM graph, which was represented as (nodes, tmap) during the memory analysis phase is traversed to identify the partition tokens. The partitioner/compiler creates a separate graph, the token graph, for example, in Python's NetworkX library representation. Edges in this graph denote the source and destination tokens, as well as their metadata. The metadata shows which IMEM graph nodes (i.e., which specific CC and IMEM_READ) constitute the edges of the token graph.

In FIG. 16, these tokens (groups of IMEM primitives including IMEM_Write, IMEM_read, and CCs) are identified and marked on the IMEM graph. The figure shows tokens 3, 4, 5 and 52, and the edges between them. These edges can have metadata as below:

| SRC | DST | Metadata (i.e., IMEM Graph node names) |
|---|---|---|
| 4 | 5 | {'node_names': 'imem_cc_23, imem_wr_100'} |
| 4 | 6 | {'node_names': 'imem_cc_26, imem_wr_106'} |
| 5 | 52 | {'node_names': 'imem_cc_24, imem_wr_102'} |
| 52 | 4 | {'node_names': 'imem_cc_25, imem_wr_ 104'} |

One can take the token graph from FIG. 16 and greedily fill (e.g., fill using a greedy algorithm) in tokens to PFUs in a depth first search fashion. This does not produce the optimal partition, but does create a starting point.

The final optimizations can be done via a command line tool in which the user can manually move tokens between partitions. This tool can check if a move is valid (e.g., if this new token would fit into the noted PFU). If valid, it can remove a token from the source PFU, and add it into the destination PFU. To be able to determine the validity, these functions need to be aware of the PFU's physical constraints (IMEM size; number of CCs, IMEM_READs, IMEM_WRITEs, Configurable Buffers). Note that these parameters are configurable, and therefore, the partitioner can map segments of the token graph into PFUs of differing specs. In one aspect, the final optimizations can be automated by a suitable algorithm such that user input is only optional.

Partition Problem as a Generalized Graph Theory Problem

Here one can re-formulate the segmentation problem as a pure graph theory decomposition problem, abstracted away from the PFA architecture. A token graph G={V, E} is a graph of tokens. W is a set of weights, of size m, that each V contains. A partition is a subset of G constrained by:

(1) There exists 1 to x external inputs and 1 to y external outputs.
(2) For weight n in weights:
For all Vi in Partitionj: Sumi (Vi.n)<Partitionj.maxn Each partition has a set Wmax of size m. The problem is to find a complete partition of that graph such that the number of partitions is minimized.

While not bound by any theory, it is believed that the optimal placement of the token graphs is best derived from a generalized graph theory problem. In one aspect, the optimal placement of the token graphs can only be derived from a generalized graph theory problem. In general, the problem of mapping the CNN to the CNN processor or PFU is basically a constrained graph placement problem, and is really an open ended problem. The description above presents formulated steps to make the problem easy each and achieve a solution relatively easily. For instance, while performing a manual optimization after the greedy algorithm for placing the tokens (e.g., as in the flowchart of FIG. 3), a graph optimization algorithm may do a better job of placing the tokens.

Figure 17:
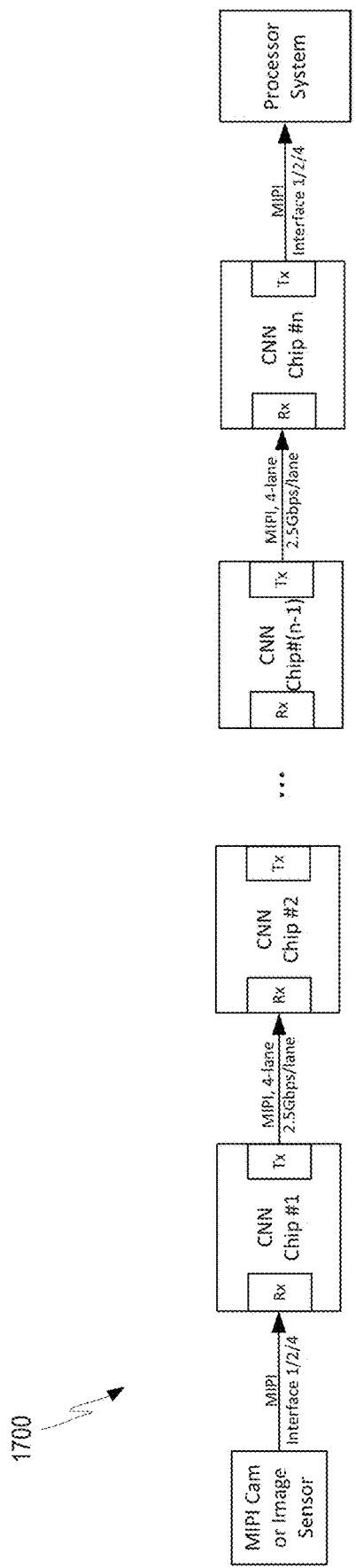
FIG. 17 is a schematic block diagram illustrating a multi-chip implementation of a CNN where each chip includes a finite number of PFUs that are coupled across chip boundaries in accordance with some aspects of the disclosure.

FIG. 17 is a schematic block diagram illustrating a multi-chip implementation 1700 of a CNN where each chip includes a finite number of PFUs that are coupled across chip boundaries in accordance with some aspects of the disclosure. The multi-chip implementation 1700 includes CNN Chips #1-n each coupled by a MIPI bus, and Chip #1 coupled to a MIPI source such as a MIPI camera or other image sensor. The last CNN Chip #n is coupled to a processing system.

PFAs have a limited number of PFUs in them. It is possible for a neural network to be big enough that it will not fit in a single PFA (e.g., single chip PFA with multiple PFUs). In this case, one can chain multiple PFA (each having multiple PFUs) silicon dies together. There might be some delays for inter-PFA connections, as they are across chip connections. This implementation is shown in FIG. 17.

PFUs have a set number of m inputs and outputs, and PFAs have n tensors that can be transported across the chip boundary depending on the hardware implementation details. If m≠n, the partitioner needs to take this into account when assigning a token into the last PFU of the source PFA and the first PFU of the destination PFA. The partitioner would assign tokens in a way that the last PFU in the source PFA and the first PFU in the destination PFA, would have less than or equal to n allocated outputs and inputs respectively. This would allow the n tensors to be transported across the chip boundary. In the special case of m=n, this boundary becomes transparent to the Partitioner. Therefore, one can treat inter-PFA connections as if they were regular inter-PFU connections within the same PFA.

Figure 18:
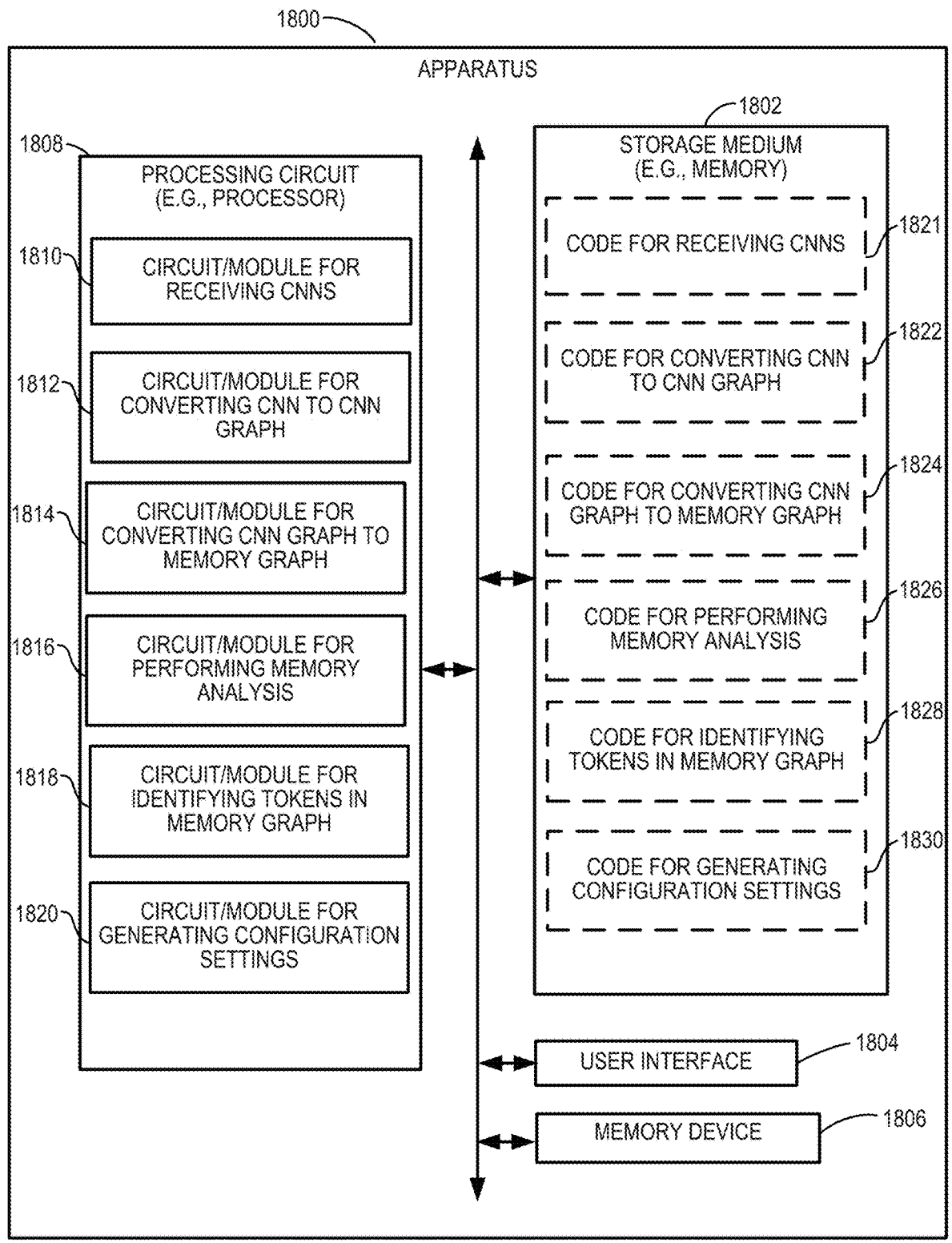
FIG. 18 is a block diagram of a computing device that can be used to execute a compiler in accordance with some aspects of the disclosure.

FIG. 18 is a block diagram of a computing device/apparatus 1800 that can be used to execute a compiler in accordance with some aspects of the disclosure. The apparatus 1800 includes a storage medium 1802, a user interface 1804, a memory device (e.g., a memory circuit) 1806, and a processing circuit 1808 (e.g., at least one processor). In various implementations, the user interface 1804 may include one or more of: a keypad, a display, a speaker, a microphone, a touchscreen display, of some other circuitry for receiving an input from or sending an output to a user. These components can be coupled to and/or placed in electrical communication with one another via a signaling bus or other suitable component, represented generally by the connection lines in FIG. 18. The signaling bus may include any number of interconnecting buses and bridges depending on the specific application of the processing circuit 1808 and the overall design constraints. The signaling bus links together various circuits such that each of the storage medium 1802, the user interface 1804, and the memory device 1806 are coupled to and/or in electrical communication with the processing circuit 1808. The signaling bus may also link various other circuits (not shown) such as timing sources, peripherals, voltage regulators, and power management circuits, which are well known in the art, and therefore, will not be described any further.

The memory device 1806 may represent one or more memory devices. In some implementations, the memory device 1806 and the storage medium 1802 are implemented as a common memory component. The memory device 1806 may also be used for storing data that is manipulated by the processing circuit 1808 or some other component of the apparatus 1800.

The storage medium 1802 may represent one or more computer-readable, machine-readable, and/or processor-readable devices for storing programming, such as processor executable code or instructions (e.g., software, firmware), electronic data, databases, or other digital information. The storage medium 1802 may also be used for storing data that is manipulated by the processing circuit 1808 when executing programming. The storage medium 1802 may be any available media that can be accessed by a general purpose or special purpose processor, including portable or fixed storage devices, optical storage devices, and various other mediums capable of storing, containing or carrying programming.

By way of example and not limitation, the storage medium 1802 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, a key drive, or a solid state drive (SSD)), a random access memory (RAM), a read only memory (ROM), a programmable ROM (PROM), an erasable PROM (EPROM), an electrically erasable PROM (EEPROM), a register, an OTP memory, a removable disk, and any other suitable medium for storing software and/or instructions that may be accessed and read by a computer. The storage medium 1802 may be embodied in an article of manufacture (e.g., a computer program product). By way of example, a computer program product may include a computer-readable medium in packaging materials. In view of the above, in some implementations, the storage medium 1802 may be a non-transitory (e.g., tangible) storage medium. For example, the storage medium 1802 may be a non-transitory computer-readable medium storing computer-executable code, including code to perform operations as described herein.

The storage medium 1802 may be coupled to the processing circuit 1808 such that the processing circuit 1808 can read information from, and write information to, the storage medium 1802. That is, the storage medium 1802 can be coupled to the processing circuit 1808 so that the storage medium 1802 is at least accessible by the processing circuit 1808, including examples where at least one storage medium is integral to the processing circuit 1808 and/or examples where at least one storage medium is separate from the processing circuit 1808 (e.g., resident in the apparatus 1800, external to the apparatus 1800, distributed across multiple entities, etc.).

Programming stored by the storage medium 1802, when executed by the processing circuit 1808, causes the processing circuit 1808 to perform one or more of the various functions and/or process operations described herein. For example, the storage medium 1802 may include operations configured for regulating operations at one or more hardware blocks of the processing circuit 1808.

The processing circuit 1808 is generally adapted for processing, including the execution of such programming stored on the storage medium 1802. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1808 is arranged to obtain, process and/or send data, control data access and storage, issue commands, and control other desired operations. The processing circuit 1808 may include circuitry configured to implement desired programming provided by appropriate media in at least one example. For example, the processing circuit 1808 may be implemented as one or more processors, one or more controllers, and/or other structure configured to execute executable programming. Examples of the processing circuit 1808 may include a general purpose processor, a graphics processing unit (GPU), a digital signal processor (DSP), an application-specific integrated circuit (ASIC for example including a RISC processor and a CNN processor), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1808 may also be implemented as a combination of computing components, such as a combination of a GPU and a microprocessor, a DSP and a microprocessor, a number of microprocessors, one or more microprocessors in conjunction with a DSP core, an ASIC and a microprocessor, or any other number of varying configurations. These examples of the processing circuit 1808 are for illustration and other suitable configurations within the scope of the disclosure are also contemplated.

According to one or more aspects of the disclosure, the processing circuit 1808 may be adapted to perform any or all of the features, processes, functions, operations and/or routines for any or all of the apparatuses described herein. For example, the processing circuit 1808 may be configured to perform any of the steps, functions, and/or processes described with respect to FIGS. 1-17. As used herein, the term "adapted" in relation to the processing circuit 1808 may refer to the processing circuit 1808 being one or more of configured, employed, implemented, and/or programmed to perform a particular process, function, operation and/or routine according to various features described herein.

The processing circuit 1808 may be a specialized processor, such as a GPU or an application-specific integrated circuit (ASIC) that serves as a means for (e.g., structure for) carrying out any one of the operations described in conjunction with FIGS. 1-17. The processing circuit 1808 serves as one example of a means for performing the functions of any of the circuits/modules contained therein. In various implementations, the processing circuit 1808 may provide and/or incorporate, at least in part, the functionality described above for the compilers of FIGS. 1-17.

According to at least one example of the apparatus 1800, the processing circuit 1808 may include one or more of a circuit/module for receiving a CNN 1810, a circuit/module for converting the CNN into a CNN graph 1812, a circuit/module for converting the CNN graph into a memory graph comprising graph primitives corresponding to a plurality of components of the CNN processor including a primary memory 1814, a circuit/module for performing a memory analysis to determine an amount of memory required in the primary memory for at least one of the graph primitives 1816, a circuit/module for identifying a plurality of tokens within the memory graph to form a token graph, each of the plurality of tokens comprising one or more of the graph primitives 1818, a circuit/module for generating, using the plurality of identified tokens, configuration settings for each of the plurality of components of the CNN processor 1820, and/or other suitable circuit modules. In various implementations, these circuits/modules may provide and/or incorporate, at least in part, the functionality described above for FIGS. 1-17.

As mentioned above, programming stored by the storage medium 1802, when executed by the processing circuit 1808, causes the processing circuit 1808 to perform one or more of the various functions and/or process operations described herein. For example, the programming may cause the processing circuit 1808 to perform the various functions, steps, and/or processes described herein with respect to FIGS. 3-16 in various implementations. As shown in FIG. 18, the storage medium 1802 may include one or more of code for receiving a CNN 1821, code for converting the CNN into a CNN graph 1822, code for converting the CNN graph into a memory graph comprising graph primitives corresponding to a plurality of components of the CNN processor including a primary memory 1824, code for performing a memory analysis to determine an amount of memory required in the primary memory for at least one of the graph primitives 1826, code for identifying a plurality of tokens within the memory graph to form a token graph, each of the plurality of tokens comprising one or more of the graph primitives 1828, code for generating, using the plurality of identified tokens, configuration settings for each of the plurality of components of the CNN processor 1830, and/or other suitable circuit modules.

IMEM Graph as a Cross-Platform Programming Model

So far the IMEM graph was discussed as a map of an infinite PFU. The assumption was that the graph would eventually be mapped into a physical PFU. This does not need to be the case. In this section, the IMEM graph is introduced as a cross-platform programming model and may be thought of as running on an abstract machine, analogous to how Java is compiled into an device-agnostic intermediate bytecode through java virtual machine (JVM).

An IMEM graph can contain all necessary information to run inference, with IMEM_READs, IMEM_WRITEs and CORE_COMPUTEs. These 3 operators, or primitives, can be thought of as building blocks of an abstract dataflow machine, and are enough to describe inference computations on any trained neural network. This document defines a specification of how these 3 operators behave. The computations described by an IMEM graph are hardware independent. Therefore, if a hardware platform implements this specification, they will be able to run the abstract dataflow machine described herein. This abstract machine optimizes the amount of computation memory required by performing the memory liveness analysis.

If a platform implements these 3 abstract operators and provides the user an application programming interface (API) to use it, this compiler and partitioner can create an IMEM graph that can run inference on the noted hardware. The user does not have to implement low level functions, or think about the hardware's implementation details. The IMEM graph provides the lowest level abstraction required.

Just like in NVidia's compute unified device architecture (CUDA) exposes "virtual" cores for a programmer to use, this disclosure exposes these 3 abstract operators. An example would be to use CUDA cores to implement the 3 operators, in that case the disclosed compiler could compile neural networks to run inference on NVidia GPUs. This opens up the possibility of including currently underutilized hardware options (such as Radeon GPUs) for machine learning inference, especially if low memory usage is of importance.

Additional Aspects

The examples set forth herein are provided to illustrate certain concepts of the disclosure. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequences of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise, a set of elements may include one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. A method for fitting a convolutional neural network (CNN) to a CNN processor to be performed by a compiler, the method comprising:
   receiving a CNN;
   converting the CNN into a CNN graph;
   converting the CNN graph into a memory graph comprising graph primitives corresponding to a plurality of components of the CNN processor including a primary memory;
   performing a memory analysis to determine an amount of memory required in the primary memory for at least one of the graph primitives;
   identifying a plurality of tokens within the memory graph to form a token graph, each of the plurality of tokens comprising one or more of the graph primitives; and
   generating, using the plurality of identified tokens, configuration settings for each of the plurality of components of the CNN processor.

2. The method of claim 1, wherein the graph primitives comprise a write buffer, a read buffer, and a core compute element.

3. The method of claim 2, wherein the core compute element is pre-configured to perform at least one function of the CNN, the at least one function comprising at least one of convolution, batch normalization, pooling, or activation.

4. The method of claim 2, wherein the write buffer and the read buffer are sub-components of the primary memory.

5. The method of claim 2:
   wherein the performing the memory analysis to determine the amount of memory required in the primary memory for at least one of the graph primitives comprises:
      determining a minimum number of lines of an image to be stored in the primary memory, the image to be processed by the core compute element; and
   wherein the configuration settings for the core compute element comprise the minimum number of lines to be stored in the primary memory.

6. The method of claim 5:
   wherein the performing the memory analysis to determine the amount of memory required in the primary memory for at least one of the graph primitives further comprises:
      refraining from storing the lines of the image other than the minimum number in the primary memory.

7. The method of claim 1:
   wherein the performing the memory analysis to determine the amount of memory required in the primary memory for at least one of the graph primitives further comprises:
      determining an expected delay in exchanges of data between at least two of the graph primitives;
      determining, based on the expected delay, a minimum number of lines of an image to be stored in the primary memory, the image to be processed by a core compute element; and
   wherein the configuration settings for the core compute element comprise the minimum number of lines to be stored in the primary memory.

8. The method of claim 1:
   wherein the CNN comprises a plurality of programmable functional units; and
   wherein the identifying the plurality of tokens within the memory graph to form the token graph comprises:
      identifying groups of the graph primitives to be mapped to one of the plurality of programmable functional units, wherein each token of the plurality of tokens represents a group of the graph primitives to be mapped to one of the plurality of programmable functional units.

9. The method of claim 8, further comprising:
   performing, using a greedy or a heuristic technique, a simulated placement of each token within one of the plurality of programmable functional units to determine an optimized placement.

10. The method of claim 9, further comprising repeating the simulated placement to determine the optimized placement.

11. The method of claim 9, further comprising:
    determining, based on the simulated placement, that the CNN in the token graph format will fit within the CNN processor; and
    wherein the generating, using the plurality of identified tokens, configuration settings for each of the plurality of components of the CNN processor comprises generating, based on the determination that the CNN will fit and using the plurality of identified tokens, configuration settings for each of the plurality of components of the CNN processor.

12. The method of claim 1:
wherein the graph primitives comprise a plurality of core compute elements; and
wherein the generating, using the plurality of identified tokens, configuration settings for each of the plurality of components of the CNN processor comprises generating, using the plurality of identified tokens, configuration settings for the core compute elements such that each of the core compute elements does not store inputs and does not store intermediate tensor values.

13. A non-transitory computer-readable medium storing computer-executable instructions for fitting a convolutional neural network (CNN) to a CNN processor to be performed by a compiler, the medium comprising instructions for:
receiving a CNN;
converting the CNN into a CNN graph;
converting the CNN graph into a memory graph comprising graph primitives corresponding to a plurality of components of the CNN processor including a primary memory;
performing a memory analysis to determine an amount of memory required in the primary memory for at least one of the graph primitives;
identifying a plurality of tokens within the memory graph to form a token graph, each of the plurality of tokens comprising one or more of the graph primitives; and
generating, using the plurality of identified tokens, configuration settings for each of the plurality of components of the CNN processor.

14. The computer-readable medium of claim 13, wherein the graph primitives comprise a write buffer, a read buffer, and a core compute element.

15. The computer-readable medium of claim 14, wherein the core compute element is pre-configured to perform at least one function of the CNN, the at least one function comprising at least one of convolution, batch normalization, pooling, or activation.

16. The computer-readable medium of claim 14, wherein the write buffer and the read buffer are sub-components of the primary memory.

17. The computer-readable medium of claim 14:
wherein the instructions for performing the memory analysis to determine the amount of memory required in the primary memory for at least one of the graph primitives comprises:
instructions for determining a minimum number of lines of an image to be stored in the primary memory, the image to be processed by the core compute element; and
wherein the configuration settings for the core compute element comprise the minimum number of lines to be stored in the primary memory.

18. The computer-readable medium of claim 17:
wherein the instructions for performing the memory analysis to determine the amount of memory required in the primary memory for at least one of the graph primitives further comprises:
instructions for refraining from storing the lines of the image other than the minimum number in the primary memory.

19. The computer-readable medium of claim 13:
wherein instructions for performing the memory analysis to determine the amount of memory required in the primary memory for at least one of the graph primitives further comprises:
instructions for determining an expected delay in exchanges of data between at least two of the graph primitives;
instructions for determining, based on the expected delay, a minimum number of lines of an image to be stored in the primary memory, the image to be processed by a core compute element; and
wherein the configuration settings for the core compute element comprise the minimum number of lines to be stored in the primary memory.

20. The computer-readable medium of claim 13:
wherein the CNN comprises a plurality of programmable functional units; and
wherein the instructions for identifying the plurality of tokens within the memory graph to form the token graph comprises:
instructions for identifying groups of the graph primitives to be mapped to one of the plurality of programmable functional units, wherein each token of the plurality of tokens represents a group of the graph primitives to be mapped to one of the plurality of programmable functional units.

21. The computer-readable medium of claim 20, further comprising instructions for:
performing, using a greedy or a heuristic technique, a simulated placement of each token within one of the plurality of programmable functional units to determine an optimized placement.

22. The computer-readable medium of claim 21, further comprising instructions for repeating the simulated placement to determine the optimized placement.

23. The computer-readable medium of claim 21, further comprising instructions for:
determining, based on the simulated placement, that the CNN in the token graph format will fit within the CNN processor; and
wherein the instructions for generating, using the plurality of identified tokens, configuration settings for each of the plurality of components of the CNN processor comprise instructions for generating, based on the determination that the CNN will fit and using the plurality of identified tokens, configuration settings for each of the plurality of components of the CNN processor.

24. The computer-readable medium of claim 13:
wherein the graph primitives comprise a plurality of core compute elements; and
wherein the instructions for generating, using the plurality of identified tokens, configuration settings for each of the plurality of components of the CNN processor comprise instructions for generating, using the plurality of identified tokens, configuration settings for the core compute elements such that each of the core compute elements does not store inputs and does not store intermediate tensor values.

* * * * *